US011687254B2

(12) United States Patent
Carlough et al.

(10) Patent No.: US 11,687,254 B2
(45) Date of Patent: *Jun. 27, 2023

(54) HOST SYNCHRONIZED AUTONOMOUS DATA CHIP ADDRESS SEQUENCER FOR A DISTRIBUTED BUFFER MEMORY SYSTEM

(71) Applicant: International Business Machines Corporation, Armonk, NY (US)

(72) Inventors: Steven R. Carlough, Poughkeepsie, NY (US); Susan M. Eickhoff, Hopewell Junction, NY (US); Patrick J. Meaney, Poughkeepsie, NY (US); Stephen J. Powell, Austin, TX (US); Gary A. Van Huben, Poughkeepsie, NY (US); Jie Zheng, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/676,962

(22) Filed: Nov. 7, 2019

(65) Prior Publication Data

US 2020/0073565 A1 Mar. 5, 2020

Related U.S. Application Data

(63) Continuation of application No. 15/825,909, filed on Nov. 29, 2017, now Pat. No. 10,534,555.

(51) Int. Cl.
*G06F 3/06* (2006.01)
(52) U.S. Cl.
CPC ............ *G06F 3/0626* (2013.01); *G06F 3/065* (2013.01); *G06F 3/0611* (2013.01);
(Continued)

(58) Field of Classification Search
CPC ........................... G06F 3/0659; G06F 13/1673
See application file for complete search history.

(56) References Cited

U.S. PATENT DOCUMENTS

| 5,815,723 A | 9/1998 | Wilkinson et al. |
| 6,104,751 A | 8/2000 | Artieri |

(Continued)

FOREIGN PATENT DOCUMENTS

| CN | 101099140 A | 1/2008 |
| CN | 105553636 A | 5/2016 |

(Continued)

OTHER PUBLICATIONS

English-language translation of a German Office Action dated Feb. 2, 2021 received in a corresponding foreign application, 9 pages.

(Continued)

*Primary Examiner* — David Yi
*Assistant Examiner* — Nicholas A. Paperno
(74) *Attorney, Agent, or Firm* — Scully, Scott, Murphy & Presser, P.C.

(57) ABSTRACT

One or more memory systems, architectural structures, and/or methods of storing information in memory devices is disclosed to improve the data bandwidth and or to reduce the load on the communications links in a memory system. The system may include one or more memory devices, one or more memory control circuits and one or more data buffer circuits. In one embodiment, the Host only transmits data (and CRC) and does not transmit control signals, over its communications link with the data buffer circuits. In one aspect, the memory control circuit does not send the store data tag to the data buffer circuits. In one embodiment, the Host and the data buffer circuits each maintain a separate state machine-driven address pointer or local address sequencer, e.g., local store tag FIFO, which contains the (Continued)

same tags in the same sequence. A periodic system check and resynchronization method is also disclosed.

16 Claims, 10 Drawing Sheets

(52) U.S. Cl.
CPC .......... *G06F 3/0658* (2013.01); *G06F 3/0659* (2013.01); *G06F 3/0685* (2013.01)

(56) References Cited

U.S. PATENT DOCUMENTS

| | | | |
|---|---|---|---|
| 6,510,100 | B2 | 1/2003 | Grundon et al. |
| 6,757,800 | B1 | 6/2004 | Estakhri et al. |
| 7,330,992 | B2 | 2/2008 | Jeddeloh et al. |
| 7,984,329 | B2 | 7/2011 | Lastras-Montano et al. |
| 8,180,931 | B2 | 5/2012 | Lee et al. |
| 8,612,684 | B2 | 12/2013 | Briggs et al. |
| 8,788,747 | B2 | 7/2014 | Ahn et al. |
| 9,146,864 | B2 | 9/2015 | Retter et al. |
| 9,170,753 | B2 | 10/2015 | Chen et al. |
| 9,201,817 | B2 | 12/2015 | Chu et al. |
| 9,235,680 | B2 | 1/2016 | Rooyen et al. |
| 9,348,518 | B2 | 5/2016 | Fields, Jr. et al. |
| 9,430,418 | B2 | 8/2016 | Meaney et al. |
| 9,589,626 | B1 | 3/2017 | Liu et al. |
| 9,792,965 | B2 | 10/2017 | Best et al. |
| 9,836,415 | B2 | 12/2017 | Shan et al. |
| 10,223,299 | B2 | 3/2019 | Ware et al. |
| 10,395,698 | B2 | 8/2019 | Carlough et al. |
| 2001/0054121 | A1 | 12/2001 | Proch et al. |
| 2005/0177657 | A1 | 8/2005 | Pope et al. |
| 2006/0179213 | A1 | 8/2006 | Brittain et al. |
| 2007/0180186 | A1 | 8/2007 | Cornwell et al. |
| 2011/0087808 | A1 | 4/2011 | Durand et al. |
| 2012/0233500 | A1 | 9/2012 | Roettgermann et al. |
| 2014/0281191 | A1 | 9/2014 | Retter et al. |
| 2015/0006841 | A1 | 1/2015 | Chen et al. |
| 2015/0160920 | A1 | 6/2015 | Bergkvist, Jr. et al. |
| 2015/0255130 | A1 | 9/2015 | Lee et al. |
| 2015/0261446 | A1 | 9/2015 | Lee |
| 2016/0092361 | A1 | 3/2016 | Grimsrud et al. |
| 2016/0328156 | A1* | 11/2016 | Swarbrick ........... G06F 13/4234 |
| 2017/0109058 | A1 | 4/2017 | Shallal et al. |
| 2018/0181504 | A1 | 6/2018 | Morris et al. |
| 2019/0163362 | A1 | 5/2019 | Carlough et al. |
| 2019/0163378 | A1 | 5/2019 | Carlough et al. |
| 2019/0163384 | A1 | 5/2019 | Carlough et al. |

FOREIGN PATENT DOCUMENTS

| | | |
|---|---|---|
| JP | 2005092630 A | 4/2005 |
| JP | 2006221642 A | 8/2006 |
| JP | 2006313538 A | 11/2006 |
| WO | 2019106496 A1 | 6/2019 |

OTHER PUBLICATIONS

Anonymous, "Hardware Engine (CCS) for Initialization and Test of DDR3 and DDR4 DRAMs", IP.com Prior Art Database Technical Disclosure, IP.com No. IPCOM000228100D, Jun. 6, 2013, 6 pages.
Siemens et al.. "Buffer Device for Memory Modules (DIMM)", IP.com Prior Art Database Technical Disclosure, IP.com No. IPCOM000144850D, Feb. 10, 2007, 2 pages.
IBM, "Memory Controller and Protocol for Small-Granularity DRAM-access", IP.com Prior Art Database Technical Disclosure, IP.com No. IPCOM000182894D, May 8, 2009, 4 pages.
Hovis, et al., "Method for Reduction in Memory Requirements via Tag Bit Replication", IBM Technical Disclosure Bulletin, vol. 38, No. 4, Apr. 1995, pp. 513-515.
Stratifylabs, A FIFO Buffer Implementation:, Oct. 2, 2013, pp. 1-5.
International Search Report and Written Opinion dated Mar. 11, 2019 issued in International Application No. PCT/IB2018/059206.
List of IBM Patents or Patent Applications Treated as Related, dated Nov. 7, 2019, 2 pages.
Examination Report dated Mar. 9, 2022 received from the United Kingdom Patent Office in a related foreign application, 3 pages.
English-language translation of the Japanese Office Action dated Feb. 15, 2022 received in a related foreign application, 2 pages.
Office Action dated Dec. 8, 2021 received from the United Kingdom Patent Office in a corresponding foreign application, 6 pages.
Office Action dated May 12, 2022 received in U.S. Appl. No. 16/397,154.

* cited by examiner

| BEAT | CA0 | CA1 | CA2 | CA3 | CA4 | CA5 | CA6 | CA7 |
|---|---|---|---|---|---|---|---|---|
| 1 | L0 | L1 | A0 | A1 | A2 | A3 | A4 | A5 |
| 2 | A6 | A7 | A8 | A9 | A10 | A11 | A12 | A13 |
| 3 | A14 | A15 | A16 | A17 | A18 | A19 | A20 | A21 |
| 4 | A22 | A23 | A24 | A25 | A26 | A27 | A28 | A29 |
| 5 | A30 | A31 | A32 | A33 | A34 | A35 | A36 | A37 |
| 6 | A38 | C0 | C1 | C2 | C3 | Q0 | Q1 | Q2 |
| 7 | Q3 | Q4 | Q5 | Q6 | ACK | P0 | P1 | P2 |
| 8 | P3 | P4 | P5 | P6 | P7 | P8 | P9 | P10 |

Fig. 5

| Memory Cycle 1 | | | Memory Cycle 3 | | | Memory Cycle 5 | | | Memory Cycle 7 | | | Memory Cycle 9 | | |
|---|---|---|---|---|---|---|---|---|---|---|---|---|---|---|
| Beat | RX0 | RX1 | Beat | RX0 | RX1 | Beat | RX0 | RX1 | Beat | RX0 | RX1 | Beat | RX0 | RX1 |
| 0 | D0 | D8 | 16 | D32 | D40 | 32 | D64 | D72 | 48 | D96 | D104 | 64 | CRC0 | CRC8 |
| 1 | D1 | D9 | 17 | D33 | D41 | 33 | D65 | D73 | 49 | D97 | D105 | 65 | CRC1 | CRC9 |
| 2 | D2 | D10 | 18 | D34 | D42 | 34 | D66 | D74 | 50 | D98 | D106 | 66 | CRC2 | CRC10 |
| 3 | D3 | D11 | 19 | D35 | D43 | 35 | D67 | D75 | 51 | D99 | D107 | 67 | CRC3 | CRC11 |
| 4 | D4 | D12 | 20 | O36 | D44 | 36 | 068 | D76 | 52 | D100 | D108 | 68 | CRC4 | CRC12 |
| 5 | D5 | D13 | 21 | D37 | D45 | 37 | D69 | D77 | 53 | D101 | D109 | 69 | CRC5 | CRC13 |
| 6 | D6 | D14 | 22 | D38 | D46 | 38 | D70 | D78 | 54 | O102 | D110 | 70 | CRC6 | CRC14 |
| 7 | D7 | D15 | 23 | D39 | D47 | 39 | D71 | O79 | 55 | O103 | D111 | 71 | CRC7 | CRC15 |
| Memory Cycle 2 | | | Memory Cycle 4 | | | Memory Cycle 6 | | | Memory Cycle 8 | | | | | |
| 8 | D16 | O24 | 24 | D48 | D56 | 40 | D80 | D88 | 56 | D112 | D120 | | | |
| 9 | D17 | D25 | 25 | D49 | D57 | 41 | D81 | D89 | 57 | D113 | D121 | | | |
| 10 | D18 | D26 | 26 | D50 | D58 | 42 | D82 | D90 | 58 | D114 | D122 | | | |
| 11 | O19 | D27 | 27 | D51 | D59 | 43 | D83 | D91 | 59 | D115 | O123 | | | |
| 12 | D20 | D28 | 28 | D52 | D60 | 44 | D84 | D92 | 60 | D116 | D124 | | | |
| 13 | D21 | D29 | 29 | D53 | D61 | 45 | D85 | D93 | 61 | D117 | D125 | | | |
| 14 | D22 | D30 | 30 | D54 | D62 | 46 | D86 | D94 | 62 | D118 | D126 | | | |
| 15 | D23 | D31 | 31 | D55 | D63 | 47 | D87 | O95 | 63 | D119 | D127 | | | |

Fig. 6

| Memory Cycle 1 | | Memory Cycle 2 | | Memory Cycle 3 | | Memory Cycle 4 | |
| --- | --- | --- | --- | --- | --- | --- | --- |
| Beat | CA | Beat | CA | Beat | CA | Beat | CA |
| 0 | T0 = 1 | 8 | Q6-op1 | 16 | R0-op1 | 24 | Reserved |
| 1 | T1 = 1 | 9 | Q0-op2 | 17 | R1-op1 | 25 | CRC0 |
| 2 | Q0-op1 | 10 | Q1-op2 | 18 | D0-op1 | 26 | CRC1 |
| 3 | Q1-op1 | 11 | Q2-op2 | 19 | D1-op1 | 27 | CRC2 |
| 4 | Q2-op1 | 12 | Q3-op2 | 20 | R0-op2 | 28 | CRC3 |
| 5 | Q3-op1 | 13 | Q4-op2 | 21 | R1-op2 | 29 | CRC4 |
| 6 | Q4-op1 | 14 | Q5-op2 | 22 | D0-op2 | 30 | CRC5 |
| 7 | Q5-op1 | 15 | Q6-op2 | 23 | D1-op2 | 31 | Ack |

Fig. 7

HOST SYNCHRONIZED AUTONOMOUS DATA CHIP ADDRESS SEQUENCER FOR A DISTRIBUTED BUFFER MEMORY SYSTEM

BACKGROUND

The present invention relates to memory systems and more particularly distributed buffer memory systems.

With recent advancement of information technology and wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

The constantly increasing speed of processors which execute increasingly complex applications places more rigorous performance demands on all of the other subsystems in the computer, including the memory subsystem, where data is stored, accessed, and updated numerous times during the operation of a software application. The time consumed by memory read/write operations is a major factor in the ultimate speed and efficiency of a computer system. The memory subsystem of most computers is normally operated by a memory controller. The task of memory controllers is to move data between the computer's memory subsystem and its one or more processors as quickly and efficiently as possible. A computer's memory subsystem often comprises memory modules, usually one or more dual in-line memory modules (DIMMs) that include several dynamic random access memory (DRAM) devices.

In many memory subsystems, a memory controller may control multiple memory channels, where each channel may include one or more Dual In-line Memory Modules (DIMMs), where the DIMMs may be arranged in one or more ranks. Computing demands require the ability to access an increasing number of higher density memory devices at faster and faster access speeds.

Extensive research and development efforts are invested by the industry to create improved and or innovative solutions to maximize overall system performance by improving the memory system/subsystem design and/or structure and the methods by which the memory system/subsystem operates. Such efforts have resulted in the development of distributed memory systems, distributed buffer memory systems, registered DIMMs (RDIMMs) and load reduced DIMMs (LRDIMMs), and other systems, specifications and standards such as, for example, DDR4 and DDR5, which provide for increased memory performance.

In one example, a distributed memory system may include a plurality of memory devices, one or more Address Chips (AC), also known as memory control circuits, and a plurality of data buffer or data (DC) circuits. There are communication links or buses between a Host processor and the memory control circuits and data buffer circuits. There is also a communication link or bus from the memory control circuits to the data buffer circuits. There are also communication links between the memory devices, e.g., DRAMS, and the memory control circuits and the data buffer circuits. Bandwidth limitations on communication links can affect performance of memory systems. The amount of data, command, control and response signals sent over communication links and busses between the Host, the memory control circuits, the data buffer circuits, and the memory devices, which includes the bandwidth allocated to transmit store data control functions, e.g., the store data address tags and locations, impacts performance of memory systems.

SUMMARY

The summary of the disclosure is given to aid understanding of a memory system, architectural structure, and method of storing and fetching data, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In one embodiment a memory system for storing data in response to commands received from a Host is disclosed, the memory system comprising a memory control circuit to receive commands from the Host and to output command and control signals, at least one and preferably a plurality of memory devices configured to store data and receive command signals from the memory control circuit, and at least one and preferably a plurality of data buffer circuits associated with the at least one or more memory devices; a communications link for communicating data between the Host and the at least one memory device, wherein the communications link includes a data communications link between the Host and the at least one data buffer circuit, and the at least one data buffer circuit and the at least one memory device, and a control communications link between the memory control circuit and the at least one data buffer circuit. In one embodiment, only data (and CRC) is transmitted on the data communications link between the at least one data buffer circuit and the Host.

In one embodiment, the memory control circuit is configured to (i) receive a store command and a store data tag from Host over a communications link between the Host and the memory control circuit; (ii) in response to receiving the Host store command, decode the store command into a write-to-buffer command and store-from-buffer command; and (iii) send the write-to-buffer command to the data buffer circuit over the control communications link, but not send a tag to the data buffer circuit specifying the location to store the data in the data buffer circuit.

According to another embodiment, a memory system for reading and writing data to a memory device from the Host is disclosed, wherein the Host has a local address sequencer that has local store tag locations in a sequence; and the system includes at least one memory control circuit configured to receive commands from a Host and to output command and control signals; at least one, preferably a plurality of memory device configured to read and store data, and receive command signals from the memory control circuit; at least one, preferably a plurality of data buffer circuit associated with the at least one memory control circuit, the data buffer circuit having a local address sequencer which has local store tag locations in the same sequence as the local address sequencer of the Host; a data communications link for communicating data between the Host and the at least one data buffer circuit; and a control communications link between the at least one memory control circuit, the at least one memory device, and the at least one data buffer circuit for transmitting reading and writing operation signals of the memory system. In a further aspect, the at least one data buffer circuit is configured to obtain a local store data tag from the local address sequencer of the at least one data buffer circuit in response to receiving the write-to-buffer command; send incoming store data into data buffer pointed to by the local store data tag obtained by the local address sequencer of the at least one data buffer circuit; pull out store data from the local data buffer pointed to by store data tag received from the at least one memory control circuit, and send store data to the at least one memory device.

In yet another embodiment, a method for storing data in memory devices is disclosed, the method comprising receiving a store command along with a store data tag at a memory control circuit from a Host; sending store data to a data buffer circuit from the Host without sending a store data tag to the data buffer circuit from the Host; processing the store command in the memory control circuit into a write-to-buffer command and a store-from-buffer command; sending the write-to-buffer command to a data buffer circuit; obtaining a local store data tag from an address sequencer in a data buffer circuit; and pushing incoming data into the location in the data buffer circuit pointed to by the local store data tag obtained from the data buffer circuit local address sequencer. In another aspect, to increase reliability, and resist and avoid the local address sequencers, e.g., local store tag FIFO, from getting out of synchronization, a periodic tag check and resynchronization or recovery method may be implemented.

BRIEF DESCRIPTION OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

FIG. 5 shows the command and address frame sent over a communications link between the Host and a memory control circuit in accordance with one embodiment.

FIG. 6 shows a data frame sent over a communications link from Host to a data buffer circuit in accordance with an embodiment.

FIG. 7 shows a frame sent over a communications link from a memory control circuit to the Host in accordance with one embodiment.

DETAILED DESCRIPTION

Figure 1:
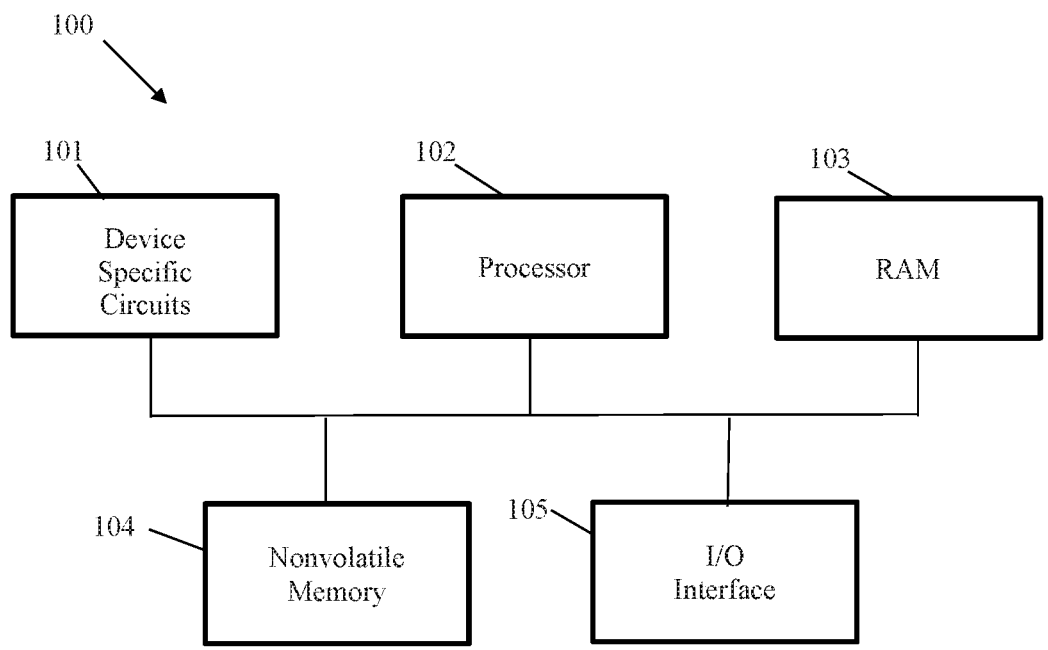
FIG. 1 depicts a general computing or data processing system in accordance with one embodiment.

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Memory systems, memory architecture, and/or methods of performing read/write operations in a memory system or subsystem, including, for example, a distributed memory system, are disclosed. In one embodiment, a memory system, architectural structure, and/or method of storing and/or fetching data in memory systems, including memory devices, is disclosed. The memory system as disclosed in more detail below may include one or more memory devices, and one or more data buffer circuits. The memory system may further include a memory control circuit, which may in one embodiment include a memory controller to control the flow of data going to and from the memory devices. There may be communication links or buses for transferring data, commands, responses, and/or signals between the Host, the memory devices, the data buffer circuits, and/or the memory control circuits.

A computer's memory subsystem often comprises memory modules, usually one or more dual in-line memory modules (DIMMs), which usually include a plurality of memory devices, e.g., dynamic random access memory (DRAM) devices. A distributed memory system may include a plurality of memory devices, e.g., DRAMS, which may be arranged on a module as a DIMM, one or more memory control circuits, and one or more data buffer circuits or data circuits. There are communication links or buses between the Host (e.g., processor), the memory control circuits, the data buffer circuits, and/or the memory devices. In one embodiment, there is a communication bus or link from the memory control circuit to the data buffer circuits. In one embodiment, there may also be a communication link or bus between the Host and the memory control circuit, and separate communications links or buses between the Host and the data buffer circuits. The memory system, and/or architectural structure may further include communications links or buses between the memory devices and the memory control circuit and/or the memory devices and the data buffer circuits.

In one embodiment, a memory system, architectural structure, and/or method of storing information is disclosed to improve the data bandwidth between the Host and the data buffer circuits. In another embodiment, a memory system, architectural structure, and/or method to reduce the load on the communications link between the memory control circuits and the data buffer circuits is disclosed. In one aspect, data buffer circuits need to know where to write store data in the write buffer prior to the data arriving at the data buffer circuits and the memory control circuit needs to know where to retrieve the data after its corresponding command is scheduled. Sending an address pointer to each data buffer circuit from the Host each time store data is sent to a data buffer circuit consumes valuable bandwidth. In one embodiment, the data buffer circuits autonomously tracks what the next store pointer should be before the data arrives from the Host without the Host having to consume valuable bandwidth of the data link between the host and data buffer circuits to specify that information. The disclosure provides an effective way to manage store data at the data buffer circuit without sending a store data tag from the Host or the memory control circuit to the data buffer circuits.

In one embodiment, the Host sends the store command to the memory control circuit and store data to the data buffer circuits. The Host manages a store data buffer address pointer or address sequencer and provides a method to synchronize the store command and store data such that the address pointer does not need to be sent to the data buffer circuits with each new store command. In one embodiment, the data buffer circuits have an address sequencer that is synchronized with the address sequencer/pointer of the Host preferably so that the sequencers contain the same tags in the same sequence. The data buffer circuits in one embodiment preferable push or write store data from the Host into the data buffer pointed to by the store data tag obtained from the data buffer circuits' local address sequencer, preferably without receiving a store data tag or control information from the Host or the memory control circuit.

In one embodiment, the memory control circuit receives the store command and the store data tag from Host. The memory control circuit schedules the store-from-buffer command, and sends the store command to the memory devices and the also sends the store-from-buffer command along with the store data tag to the data buffer circuits. In one embodiment, the memory system, architectural structure and/or method of storing information and data includes a distributed memory system having in one example the memory control circuit, data buffer circuits and memory devices arranged on a module, which in one example may include the memory control circuit on a single chip, a group of nine or ten data buffer circuits each on a single chip, and a plurality of memory devices each on a chip and preferably arranged or organized in groups of nine, e.g., 9, 18, 27, 36, etc., or ten chips, e.g., 10, 20, 30, 40, etc., all arranged on the module.

In one embodiment a memory system for storing data in response to commands received from a Host is disclosed, the memory system comprising a memory control circuit to receive commands from the Host and to output command and control signals, at least one and preferably a plurality of memory devices configured to store data and receive command signals from the memory control circuit, and at least one and preferably a plurality of data buffer circuits associated with the at least one or more memory devices; a communications link for communicating data between the Host and the at least one memory device, wherein the communications link includes a data communications link between the Host and the at least one data buffer circuit, and the at least one data buffer circuit and the at least one memory device, and a control communications link between the memory control circuit and the at least one data buffer circuit.

In one aspect, the memory system, architectural structure, and/or method for performing read/write operations improves the data bandwidth on the communication link between the Host and data buffer circuits. In one embodiment, only data (and CRC) is transmitted on the data communications link between the at least one data buffer circuit and the Host. In another embodiment, a memory system, architectural structure, and/or method to reduce the load on the communications link between the memory control circuits and the data buffer circuits is disclosed. In one embodiment, a memory system, architectural structure, and/or method of storing write data to the data buffer circuit is disclosed. In one embodiment, the disclosure provides a system, architectural structure, and/or method for the data buffer circuits to know where to put store data into their write buffer before the data arrives at the data buffer circuit and at a location that is known by the memory control circuit without the data buffer circuits telling the memory control circuit where the data buffer circuits placed the data, and without the memory control circuit telling the data buffer circuit where to place the data.

In one embodiment, the memory control circuit is configured to (i) receive a store command and a store data tag from Host over a communications link between the Host and the memory control circuit; (ii) in response to receiving the Host store command, decode the store command into a write-to-buffer command and store-from-buffer command; and (iii) send the write-to-buffer command to the data buffer circuit over the control communications link, but do not send a tag to the data buffer circuit specifying the location to store the data in the data buffer circuit. In one aspect, no store data tag is sent to the at least one data buffer circuit over the communication link between the Host and the at least one data buffer circuit. In another embodiment, the at least one data buffer circuit is configured to (i) receive store data from the Host over the data communications link between the Host and the data buffer circuit; (ii) in response to receiving a write-to-buffer command from the memory control circuit, obtain a local store data tag from a data buffer circuit local address sequencer; and (iii) push incoming store data into the data buffer pointed to by the store data tag obtained from the data buffer circuit local address sequencer.

According to one aspect, the incoming store data is pushed into the at least one data buffer circuit after a configurable delay. The memory control circuit may be configured to send a store command to the at least one memory device, the store command comprising a command and an address location to store the data in the memory devices. The memory control circuit may be further configured to send the store-from-buffer command along with store data tag to the at least one data buffer circuit. The store-from-buffer command and store data tag may be sent to the at least one data buffer circuit over a BCOM link between the memory control circuit and the data buffer circuit. The data buffer circuit according to one aspect may be further configured to pull store data from the data buffer location pointed to by the store data tag received from the memory control circuit over the control communications link and send the store data to the at least one memory device.

According to one aspect, the write-to-buffer command is not sent by the memory control circuit to the at least one data buffer circuit with a corresponding store data tag. And, the store data tag is not sent to the at least one data buffer circuit over the data communications link between the Host and the at least one data buffer circuit, and no store data tag corresponding to the write-to-buffer command is sent to the at least one data buffer circuit. In one embodiment, the Host comprises a state machine-driven local address sequencer that identifies the next address tag location of the at least one data buffer circuit to write data to, the at least one data buffer circuit comprises a state machine-driven local address sequencer that identifies the next address tag location of the at least one data buffer circuit to write data, and the state machine-driven local address pointer of the Host is synchronized with the state machine driven local address pointer of the at least one data buffer circuit. The Host local address sequencer and the at least one data buffer circuit local address sequencer preferably contain the same tags in the same sequence. According to one aspect, the system may be further configured to check whether the state machine-driven local address pointer of the Host has the same next tag as the state machine-driven local address pointer of the at least one data buffer circuit, and if the pointer is different, then resetting at least one of the local address pointers of the Host and the data buffer circuit.

According to another embodiment, a memory system for reading and writing data to a memory device from the Host is disclosed, wherein the Host has a local address sequencer that has local store tag locations in a sequence; and at least one, preferably a plurality of data buffer circuit associated with at least one memory control circuit, the data buffer circuits having local address sequencers which have local store tag locations in the same sequence as the local address sequencer of the Host. In a further aspect, the at least one data buffer circuit is configured to obtain a local store data tag from the local address sequencer of the at least one data buffer circuit in response to receiving the write-to-buffer command; send incoming store data into data buffer pointed to by the local store data tag obtained by the local address sequencer of the at least one data buffer circuit; pull out store data from the local data buffer pointed to by store data tag received from the at least one memory control circuit, and send store data to the at least one memory device. In a further aspect, the at least one memory control circuit is configured to receive a store command and a store data tag from the Host; process a store command into a write-to-buffer command and a store-from-buffer command; send the write-to-buffer command to the data buffer circuit; send the store command to the at least one memory device; and send the store-from-buffer command along with store data tag to the at least one data buffer circuit. In another aspect, the write-to-buffer command is not sent by the memory control circuit to the at least one data buffer circuit with a corresponding store data tag.

In yet another embodiment, a method for storing data in memory devices is disclosed, the method comprising receiving a store command along with a store data tag at a memory control circuit from a Host; sending store data to a data buffer circuit from the Host without sending a store data tag to the data buffer circuit from the Host; processing the store command in the memory control circuit into a write-to-buffer command and a store-from-buffer command; sending the write-to-buffer command to a data buffer circuit; obtaining a local store data tag from an address sequencer in a data buffer circuit; and pushing incoming data into the location in the data buffer circuit pointed to by the local store data tag obtained from the data buffer circuit local address sequencer. The memory control circuit may be configured not to send the store data tag received from Host local address sequencer to the data buffer circuit in response to processing the write-to-buffer command. The method may further comprise the data buffer circuit pushing incoming data into the data buffer circuit after a configuration delay in response to receiving the write-to-buffer command. The method may further include sending the store command from the memory control circuit to the memory devices; pulling store data from the data buffer pointed to by the store data tag received from the memory control circuit over the control communications link; and sending data from the data buffer circuit to the memory devices. Further yet, the method may include pushing the data buffer circuit local store data tag back to the data buffer circuit local address sequencer; and pushing the host store data tag back to the host. In one aspect, the memory control circuit knows where to retrieve the store data when it schedules the store command.

In another aspect, to increase reliability, and resist and avoid the local address sequencers, e.g., local store tag FIFO, from getting out of synchronization, a periodic tag check and resynchronization or recovery method may be implemented. The system may be further configured to check whether the state machine-driven local address pointer of the Host has the same next tag as the state machine-driven local address pointer of the at least one data buffer circuit. According to one embodiment, the system further includes circuits configured to check whether a logic circuit of the Host that tracks where in the at least one data buffer circuit to write data is synchronized with a logic circuit in the data buffer circuit to track where to write data for a store operation in the at least one data buffer circuit. In one embodiment, the Host can send its next to be used store data tag from its local address sequencer to the data buffer circuits and the data buffer circuits compare its next to be used tag from its local address sequencers against the tag sent by the Host to see if the tags are the same. In another embodiment, the data buffer circuit can send the next to be used store data tag to Host, and Host compares the tag received from each data buffer circuit to see if they are the same. If the tags are not the same, the system may undergo a recovery routine, which may among other things, reset the local address sequencers. In one embodiment, the recovery command may include at least one of the groups consisting of stop sending out any new operations, flushing all incomplete operations, waiting for all fetch operations to complete, and combinations thereof. In addition, the system may be further configured so that if the Host state machine-driver local address pointer is not pointing to the same address as the data buffer circuit state machine-driven local address pointer then at least the data buffer circuit local address pointer is reset.

In another aspect, a computer program product for storing data in memory devices, the computer program product comprising a computer readable storage medium having program instructions embodied therewith, the program instructions executable by a memory system to cause the memory system to perform a method, the method comprising receiving a host store command along with store data tag from a Host at a memory control circuit; sending store data to a data buffer circuit without a store data tag after a configurable delay; processing the store command in the memory control circuit into a write-to-buffer command and a store-from-buffer command; sending the write-to-buffer command to a data buffer circuit without a store data tag; obtaining a local store data tag from an address sequencer in a data buffer circuit; and pushing incoming data into the location in the data buffer circuit pointed to by the local store data tag obtained from the data buffer circuit local address sequencer. The computer program product wherein the data buffer circuit pushes incoming data into the data buffer in response to receiving the write-to-buffer command. The computer program product wherein the Host and the data buffer circuit each maintain a separate local address sequencer that contains the same tags in the same sequence. The computer program product further comprising sending the store command from the memory control circuit to the memory devices, and sending data to the memory devices from the data buffer pointed to by the store data tag received from the memory control circuit over the link between the memory control circuit and the data buffer circuit. The computer program product further comprising pulling a next to be used store data tag from each local address sequencer of a plurality of data buffer circuits; comparing the store data tags recovered from the local address sequencer of each data buffer circuit; and if any of the tags from the data buffer circuits are different, issuing a recovery command.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
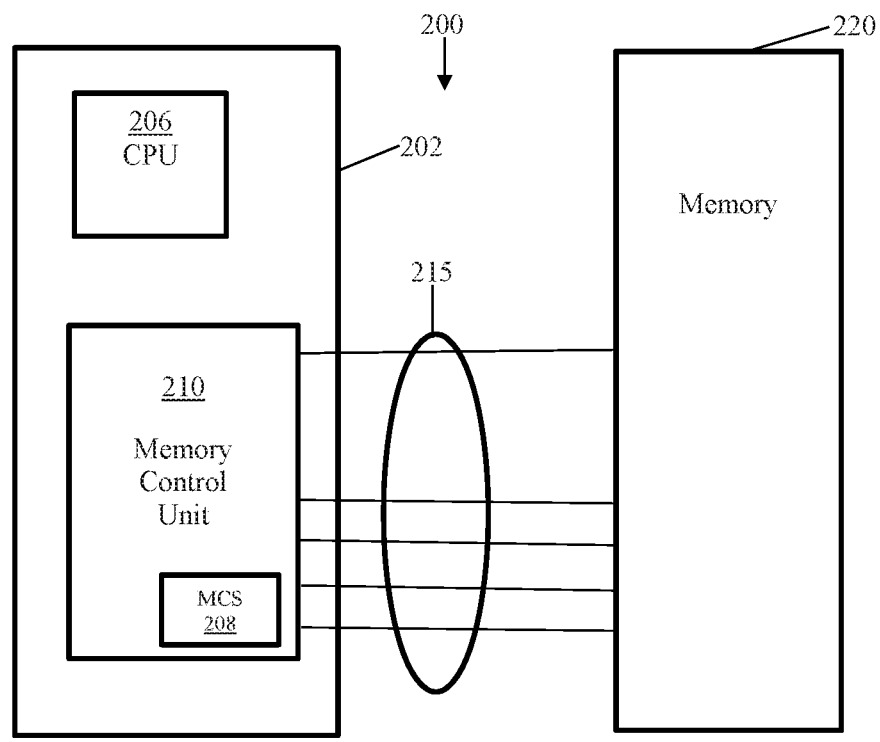
FIG. 2 depicts a memory subsystem in accordance with an embodiment.

FIG. 2 depicts an exemplary memory system 200 that may be part of a larger computer system structure or network. The computer system 200 includes a control processor system 202, which is a processing subsystem that includes at least one processor unit (CPU) 206 that may be configured to interface with a Memory Control Unit (MCU) 210. The processor or CPU 206 may be a module that processes read, write, and configuration requests from a system controller (not depicted). The processor 206 may be a multi-core processor. The MCU 210 may include a memory controller synchronous (MCS) 208, also referred to as a memory controller, that controls communication with one or more memory devices 250 (not shown in FIG. 1) in a memory subsystem 220. The MCU 210 and the MCS 208 may include one or more processing circuits, or processing may be performed by or in conjunction with the processor 206. The control processor system 202 communicates with the memory subsystem 220 through a communications bus or link 215 as will be described in more detail in connection with FIG. 4. Control processor system 202, processor or CPU 206, memory control unit 210, and MCS 208, individually and collectively, may be referred to herein as the Host. The Host as used herein is used broadly to refer to a processor, controller, or device that sends and receives command and/or control signals to a memory system or subsystem. The Host may also send and receive data signals from a memory system or subsystem.

Figure 3:
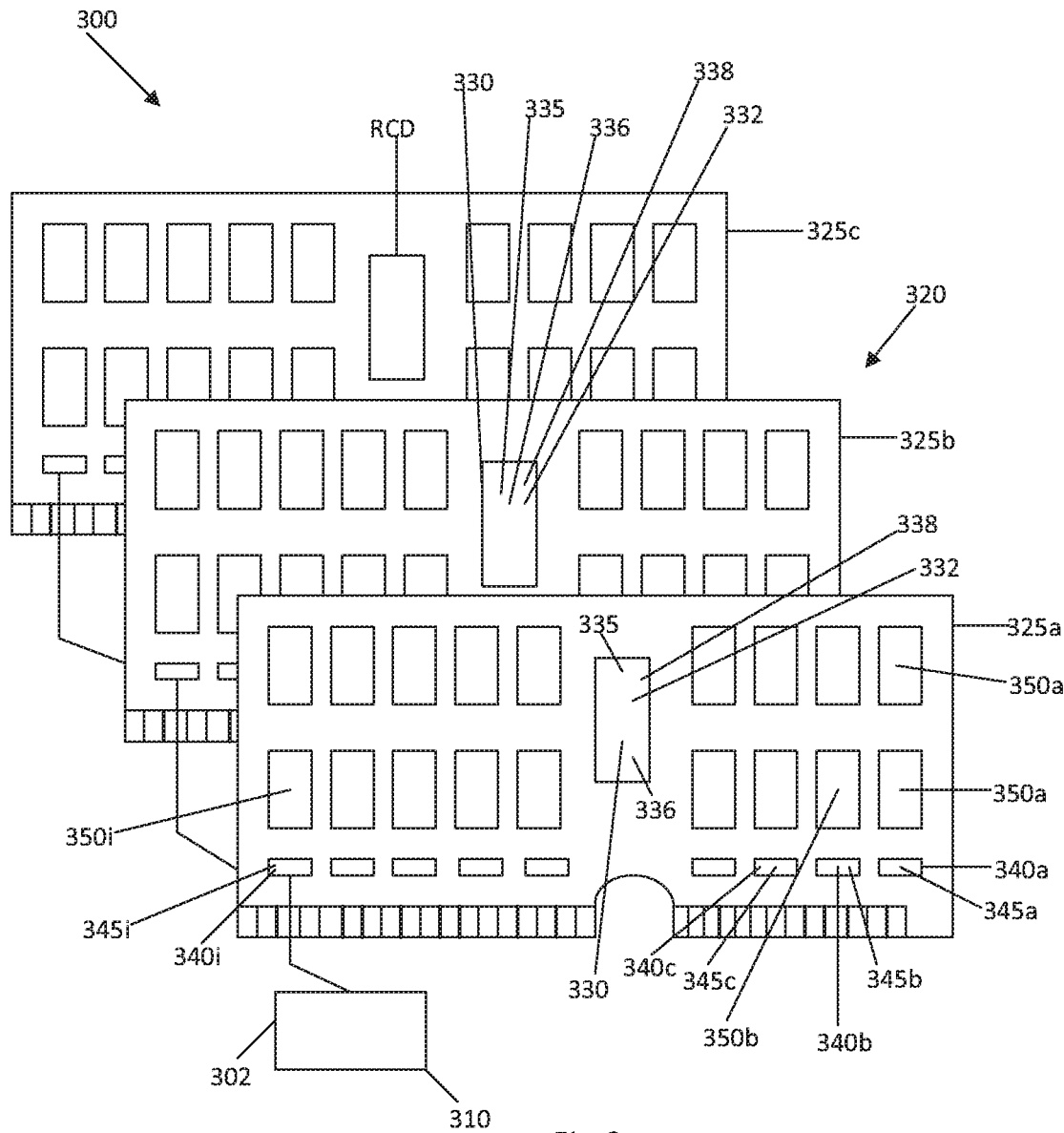
FIG. 3 depicts a memory subsystem including a buffered DIMM configuration in accordance with an embodiment.

FIG. 3 depicts an example of a memory subsystem 320. Memory system 320 comprises a plurality of memory modules, e.g., Dual Inline Memory Modules or DIMMs 325. While only three (3) DIMMs 325a-c are shown in FIG. 3, it will be appreciated that memory subsystem 320 may contain more are less DIMMs 325. The DIMMs 325 may be arranged in channels and ranks, with one or more DIMMs 325 per channel or rank. Each DIMM 325 may contain one or more volatile memory devices, e.g., Dynamic Random Access Memory chips or DRAMs 350. The memory devices 350 may be integrated circuits or chips and form the basic memory cells that hold bits of information. The memory cells in a memory device, e.g., DRAM, are usually arranged in banks, where each bank is an array of rows and columns.

The memory subsystem may also include one or more Address Chips (AC), also known as memory control circuits 330, one or more data buffer circuits or data circuits (DC) 340, also known as DC chips, and one or more memory devices 350, e.g., DRAMs. The memory control circuit manages the flow of data going to and from the memory devices. The memory control circuit typically receives signals such as command and control signals from a Host, e.g., a Host processor. The control signals may include address locations or tags on where to store data in the memory devices. The memory control circuit may output command and control signals to the memory devices and/or data buffer circuits. The memory control circuits 330 for ease of reference may also be referred to as address and command circuits, AC circuits, or AC chips. The memory control circuit 330 may or may not have a Registered Clock Driver or RCD. The memory control circuit 330 in one embodiment may have a memory controller 332. The memory control circuit 330 or memory controller 332 may have a scheduler 338. The memory controller 332 and/or scheduler 338 may optimize the order of operations and instructions, and sends out signals to the data buffer circuits and the memory devices. The memory control circuit 330/memory controller 332/memory scheduler 338 may reorder the sequence of operations. The memory control circuit may or may not be located on the board or module, e.g., DIMM, with the memory devices. In embodiments, as shown in FIG. 3, the memory control circuits 330 are formed as an integrated circuit or chip and are located on the module 325 with the memory devices 350. In one embodiment, the memory control circuit may be remote from the Host processor.

The data buffer circuits 340 buffer, receive, transmit, and/or transfer data between the Host, e.g., control processor system 302, and the memory devices 350. The data buffer circuits may or may not be located on the same board or module, e.g., DIMM, as the memory devices and/or the memory control circuits. The data buffer circuits 340 in one embodiment are also formed as integrated circuits or chips and are located on the module 325 with the memory devices 350. The data buffer circuits may also be referred to as data circuits, DC circuits, and/or DC chips.

In the example of FIG. 3, a distributed memory system 300 is illustrated having a memory control processor 302 and/or memory control unit 310, and a memory subsystem 320. The memory control unit 310, and/or memory control processor 302, may be a Host. The memory or data storage system 320 may be configured to store data and to provide storage services to one or more Hosts, which may be connected to the storage system 320 directly or through a network, (e.g., over the internet). The storage system may include an interface for supporting communications with the Host.

In the embodiment of FIG. 3, the memory subsystem 300 has three (3) DIMMS 325*a-c*. The distributed memory system 300 may have one or more control processors systems 302, and may have more or less DIMMs 325. In the distributed memory system 300 of FIG. 3, each memory module 325 is configured as a DIMM and has one memory control circuit or AC chip 330, nine (9) data buffer circuits or DC chips 340, and thirty-six (36) memory devices 350, e.g., DRAMs. The memory control circuit is configured and programmed to send command and control signals to the data buffer circuits and the memory devices. Each memory control chip or AC chip 330 in this example manages the flow of data to and from the memory devices on the module 325. Each data buffer circuit or DC chip 340 in this example interacts with and buffers data between four memory devices 350. The DIMMs may include memory devices, e.g., DRAMs, preferably arranged and organized in groups of nine, e.g., 9, 18, 27, 36 or more, or groups of ten, e.g., 10, 20, 30, or more.

Other configurations are contemplated for the memory module 325, and for the memory subsystem 320. Typically there is one memory control chip 330 per nine or ten data buffer chips 340. As an example, a DDR4 memory system may include a memory control circuit or AC chip and a group of nine (9) data buffer circuits or DC chips. While the memory device structure and/or module of FIG. 3 shows the memory devices 350 in groups of nine, it is contemplated that the memory devices may be arranged in groups of ten or more. In the example of FIG. 3, one AC chip per DIMM is illustrated, although more AC chips per DIMM may be used. The memory system architecture may be formatted and structured to support DDR4 and DDR5 standards, although the methods, systems and architecture disclosed and taught would be applicable to other configurations, including future standards.

In one example, the data buffer circuits or DC chips 340 may each have a write buffer array that is used to hold store operations from the Host processor 302 (memory control unit 310) until the memory controller 332 on the memory control circuit 330 can schedule them. There are communications buses or links between the Host 302 and the memory control circuit 330 and between the memory control circuit 330 and the memory devices 350. There is also a data communications link or bus between the Host 302 and the data buffer circuits 340 and the data buffer circuits 340 and the memory devices 350. There may be a communication link or bus 332 from the memory control circuit 330 to the data buffer circuits or DC chips 340. The communication link or bus between the memory control circuit 330 and the data buffer circuits 340 may be a one way broadcast communication link or bus called BCOM. More information on specific embodiments of the communication buses and links will be described below.

The bandwidth of the communication links impact performance of the memory system 300. In one or more embodiments, the memory system, architectural structure, and/or method of operation provide improvements in storing and/or retrieving data between a Host and one or more memory devices. In one embodiment, a memory system, architectural structure, and/or method is disclosed to improve the performance and/or bandwidth available for data on the communication link between the Host 302 and the data buffer circuit or DC chip 340. In one embodiment, the bandwidth of the communications link between the Host 302 and the data buffer circuit 340 is improved by decreasing the frequency of (or eliminating) sending control information (tags) from Host 302 to the data buffer circuit or DC chip 340.

In a further embodiment, a memory system, architectural structure, and/or method is disclosed to improve the performance and or bandwidth of the communication link between the memory control circuit 330 and the data buffer circuit or DC chip 340. In one embodiment, the bandwidth of the communications link between the memory control circuit 330 and the data buffer circuit 340 is improved by decreasing the frequency of sending control information (location tags) from the memory control circuit 330 to the data buffer circuit (DC chip) 340. To reduce demand on the link between the memory control circuit 330 and DC chips 340, in one embodiment of performing a store operation, the Host 300 sends a store command and store data tag to the memory control circuit (AC chip) 330, and the AC chip 330 sends the store data command (write-to-buffer command) to the DC chip 340, but the AC chip 330 does not send the corresponding store data tag to the DC chip 340. Instead, the Host and DC chips 340 both maintain a separate state machine-driven local address pointer or address sequencer 335, 345, e.g., store tag FIFO, that contains the same tags in the same sequence. The Host and DC chips 340 use the same tag from its local address sequencer 335, 345, e.g., local FIFO, for a store operation.

Figure 4:
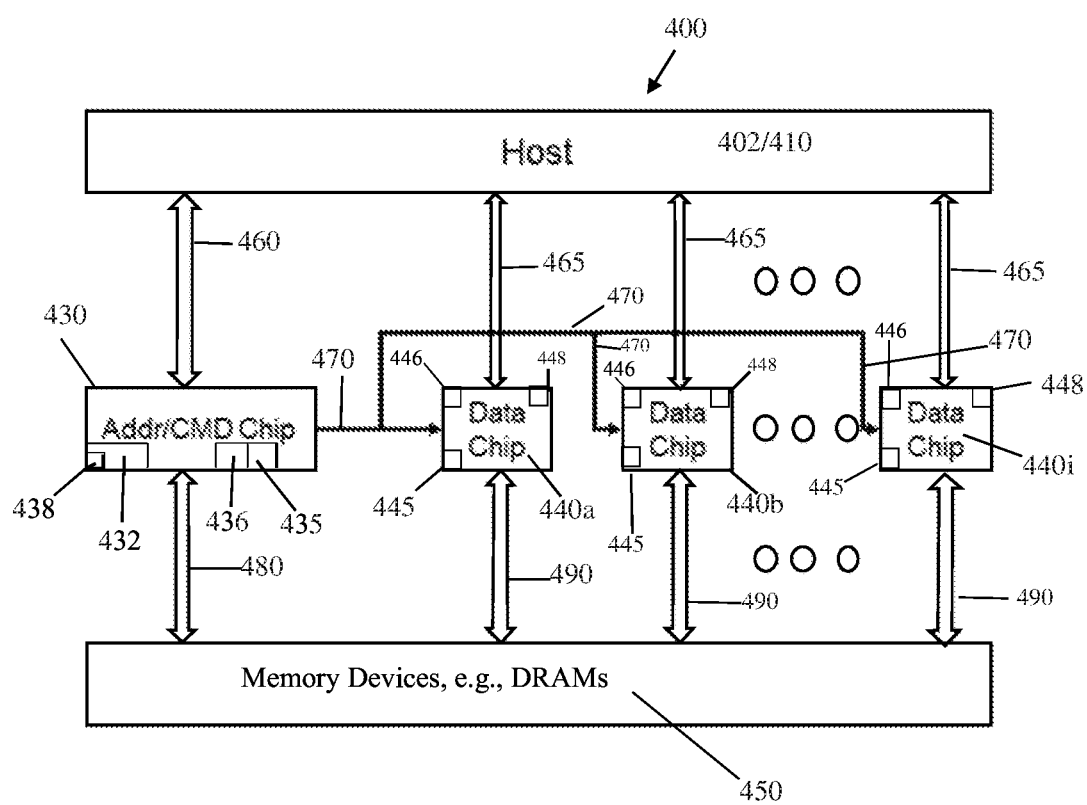
FIG. 4 diagrammatically depicts a distributed buffer memory system in accordance with one embodiment.

FIG. 4 illustrates a schematic illustration of a distributed buffer memory system 400 according to one embodiment. The system includes a plurality of memory devices 450, e.g. DRAMs. The DRAMs may be arranged on a module, usually a DIMM 325. The system 400 may have one or more DIMMs. The system may further include one or more memory control circuits or AC chips 430, and one or more data buffer circuits or DC chips 440. In one embodiment, each DIMM may include one memory control circuit or AC chip 430 and a plurality of data buffer circuits or DC chips 440 (9 or 10 chips per AC chip). Each DIMM 325 may have a plurality of memory devices, e.g., DRAMs 450, preferably arranged in groups of nine, e.g., nine (9), eighteen (18), twenty-seven (27), thirty-six (36) or more. The DIMMs may have an unequal number of memory devices, e.g., DRAMs 450. In one embodiment, the system is designed to support DDR4 or DDR5 memory systems, although other configurations and arrangements are contemplated. The memory control circuit 430 may or may not have a Regulated Clock Driver, and in one embodiment, the memory control circuit 430 may have a memory controller 432 and/or a memory scheduler 438.

Link 460 diagrammatically illustrated in FIG. 4 is a differential High Speed Serial (HSS) bus with eight (8) lanes from the Host 402/410 to the memory control circuit or AC chip 430 for sending commands to the memory subsystem 320 and one HSS lane back for reporting stats such as operations that are complete or error notification and detail. FIG. 5 shows one example of the address and command frame sent over link 460 from Host 402/410 to memory control circuit or AC chip 430. The address and command frame has two (2) bits (L0-L1) to specify the number of memory cycles to make up a frame; thirty-nine (39) bits (A0-A38) of addressable space; four (4) bits of space for commands (C0-C3); seven (7) bits (Q0-Q6) for the tagfield match sent to the DC chips for write operations; one bit (ACK) for acknowledge for the upstream frame; and eleven (11) bits P0-P10 for Cyclic Redundancy Check (CRC) code provided for lane error detection and isolation.

Link 465 is a HSS bus with two (2) lanes from the Host 402/410 to each data buffer circuit or DC chip 440 for store data and two (2) lanes from each DC chip 440 to the Host 402/410 for fetch data. For mainline operations, link 465 in an embodiment is used only for transmitting data and the required cyclic redundancy check (CRC) for protecting that data. The bandwidth of link 465 in one embodiment is not consumed for any kind of control information and may not have any bandwidth consumed for response information. All two lanes of bandwidth for link 465 is used in an embodiment to transmit only data (and CRC). FIG. 6 shows one example of a data frame for Host 402/410 to DC chip 440 communication over link 465. In FIG. 6, 128 bits (D0-D127 in memory cycles (frames) 1-8) are data fields, and sixteen (16) bits (CRC0-CRC15 in memory cycle (frame) 9) is for CRC, so that all nine (9) frames or 100% of bus or link 465 is used for data and CRC. By not using link 465 for transmitting control signals, e.g., tag or address locations, all nine (9) memory cycles are used for transmittal of data and CRC, which improves data transfer efficiency in link 465.

Link 470 is a broadcast (BCOM) bus from the memory control circuit or AC chip 430 to the data buffer circuits or DC chips 440 used to notify the DC chips when to execute the scheduled operations. For fetch operations only a command is sent over link 470 from the AC chip 430 to the DC chip 440. According to one aspect, for store operations the control memory circuit 430 processes, decodes, or cracks a store command into two suboperations called "write buffer" or "write-to-buffer," which writes data from the Host 402/410 into the data buffer on the DC chips 440, and "store buffer" or "store-from-buffer," which stores data from the DC chips 440 to the memory devices 450, e.g., DRAMs. For a write buffer, in one embodiment, a command is sent to the data buffer circuits or DC chips 440 from AC chip 430 over link 470, but a control signal, e.g., a location tag address, is not sent to the data buffer circuit, e.g., the write buffer, to save bandwidth. Instead, a state machine-driven address pointer or address sequencer 445 in each DC chip 440 tracks where the store data is to be written in the data buffer circuit, for example, the address or location in the write buffer. For a store buffer operation, both a command and control signal, e.g., a write buffer address, is sent to the data buffer circuit or DC chips 440. Operation of the memory subsystem will be described in more detail below.

An Error ATTN network 475 between data buffer circuits or DC chips 440 and memory control circuit or AC chip 430 may contain an Error ATTN signal from the data buffer circuits or DC chip 440 notifying the memory control circuit or AC chip 430 that a data buffer circuit or DC chip took an error that requires reporting to the Host 402/410. Note that the DRAM ATTN signal that indicates a memory device 450, e.g., DRAM, took an error is routed from the memory device 450 back to its DC chip 440 instead of routing them directly back to the AC chip 430. The AC chip 430 must report this error to the Host 402/410 since the DC chips 440 have no response or control information in their upstream frame. The DC chip 440 forwards the memory device errors back to the AC chip 430 via link 475, but each DC chip 440 has knowledge that one of its memory devices, e.g., DRAMs 450, took an error. The AC chip 430 routes the error signal back to the Host. The Host 402/410 may invoke its error recovery routine, and non-mainline operations from the Host 402/410 can be used to read the status registers of the DC chips 440. The Host 402/410 is then able to isolate which DC chip 440 took the error, if the error occurred on the HSS link or was an ATTN from one of its memory devices, or if it was some other error occurring on the DC chips 440. The Host 402/410 may then take action as desired to recover from the error.

Link 480 is the command and address bus or communications link from the memory control circuit or AC chips 430 to the memory devices 450, e.g. DRAMs. Links 490 are the memory devices data buses or data communications links used by the DC chip 440 to send store data to the memory devices and receive fetch data from the memory devices 450. Communication link 490 also receives the memory device ATTN signal.

Turning now to the operation of a memory system, in one embodiment, during normal operations the Host 402/410 sends store data directly to the DC Chips 440 over communications link 465 before notifying the AC chip 430 that a store is to take place. The Host 402/410 sends data to be stored to the DC chips 440 over link 465, preferably after a configurable delay. In an embodiment, no control signal, e.g., address location or tag, is sent over the communication link between the Host and the data buffer circuits. The Host sends the store operation to the memory control circuit for execution via link 460 using the format from FIG. 5. The Host 402/410 also sends in one embodiment the store data tag to the memory control circuit 430 over link 460. The store command sent by the Host to the AC chip 430 may be processed, decoded or cracked into a "write buffer" command, which writes data from the Host into the data buffer on the DC chips 440, and a "store buffer" command, which stores data from the DC chips 440 to the memory devices 450. The "write buffer" command is scheduled for execution right away, and the "store buffer" command is scheduled for execution by the memory control circuit based on optimizing system performance. The AC chip 430 may include a scheduler 438 that optimizes the order of operations and system instructions and sends out commands. The scheduler 438 can reorder operations. The memory controller 432 and/or scheduler 438 may include a store command queue or FIFO 435 for storing the store-from-buffer command.

The write buffer command is scheduled and the write buffer command is sent by the memory control circuit or AC chip 430 to the data buffer circuits or DC chips 440 over link 470. In one embodiment, the AC chip does not send an address, tag or location to the DC chip 440 identifying where the store data should be located in the write buffer of the data buffer circuits 440. Instead, each DC chip 440 tracks through a state machine-driven address pointer or address sequencer 445 where the data from the Host for the next store operation should be written to in the write buffer of the DC chip 440. Each DC chip 440 can check the CRC codes from the store data received to verify that an error did not occur over the HSS link 465. If an error is found to have occurred, the DC chip 440 notifies the AC chip 430 via the Error ATTN signal sent over network of link 475 that an error has taken place and the error is recorded in the DC chip's status register 448.

Once the Host 402/410 confirms the store data is in the write buffer of the data buffer circuit 440 (e.g., no error response from the memory control circuit in a fixed window of memory cycles (configurable or programmable delay)). The AC chip scheduler 438 may schedule the "store buffer" command when it is optimal for system performance to execute that operation. The store buffer command may be stored in the store command queue 435 until scheduled. Bank collisions, periodic operations, and fetch commands can cause a store operation to be delayed to allow other operations to complete or execute ahead of it. Once the "store buffer" operation completes, the Host store command is considered complete, and the AC chip 430 sends an upstream frame to the Host via link 480 using as an example the format in FIG. 7 to indicate which operations completed.

In one embodiment, fetch operations start with the fetch command being sent to the AC chip 430 via communications link 460 because there is no need to send data ahead of time. Fetch operations may be prioritized in the system and if the buses are available for use, a fetch operation will bypass store operations in the queue to minimize latency. If, however, there are other pending fetch operations that need to be scheduled, the fetch operation will enter the memory control circuit scheduler or memory circuit scheduler 438.

Once the memory control circuit memory scheduler 438 schedules the fetch operation to execute, the command signal and address, e.g., address (tag), is sent from the AC chip 430 over link 480 to the memory devices 450 and the DC chips 440 are informed by the AC chip 430 over link 470 that fetch data will arrive at the data buffer circuit 440 to be sent to the Host 402/410 in a fixed number of cycles. Once the fetch data arrives at the DC chips 440, the data is forwarded directly to the Host 410/402 over link 465. Fetch data preferably is not buffered as this would create additional latency. The AC chip 430 in response will then send an upstream frame to the Host notifying it that the fetch operation has completed.

The response frame indicating which operations are completed is shown in FIG. 7. In FIG. 7, two (2) bits (T0-T1) is the frame/type identifier; two (2) bits (R0-R1 (op1)) identifies the response type, e.g., store done, fetch complete, or attention response, for a first operation; seven (7) bits (Q0-Q6 (op1)) is the Command Queue Tag associated with the response type of the first operation; two (2) bits (D0-D1 (op1)) provides the frame offset code for a first operation (to specify when fetch data will return with respect to the beginning of the four (4) memory cycle frame); six (6) bits (CRC0-CRC5) is the CRC for the frame; and one bit (ACK) is the acknowledge for the downstream frames (e.g., acknowledgment for frame in FIG. 5 received by AC). For a store done response type operation, Q0-Q6 denotes the store done tag, whereas for a fetch completion response type operation, Q0-Q6 denotes the data tag associated with fetch data. When the operation is an attention (ATTN) response, one or both command queue tag fields may be overloaded to convey recovery and status error information back to Host. The response type fields R0-R1, the Command Queue fields Q0-Q6 and the frame offset fields D0-D1 have two operation fields—op1 and op2—and the fields for the second operation (op2) have the same definition as the fields for the first operation (op1). To optimize bandwidth, completion information may be sent for two operations at a time. Op2 is used to allow the AC to return two operations responses per frame (i.e., one store done operation and one fetch completion operation, two store done operations, or two fetch completion operations). The response frame sent by the AC chip to the Host when reporting error conditions would be different then FIG. 7.

Figure 8:
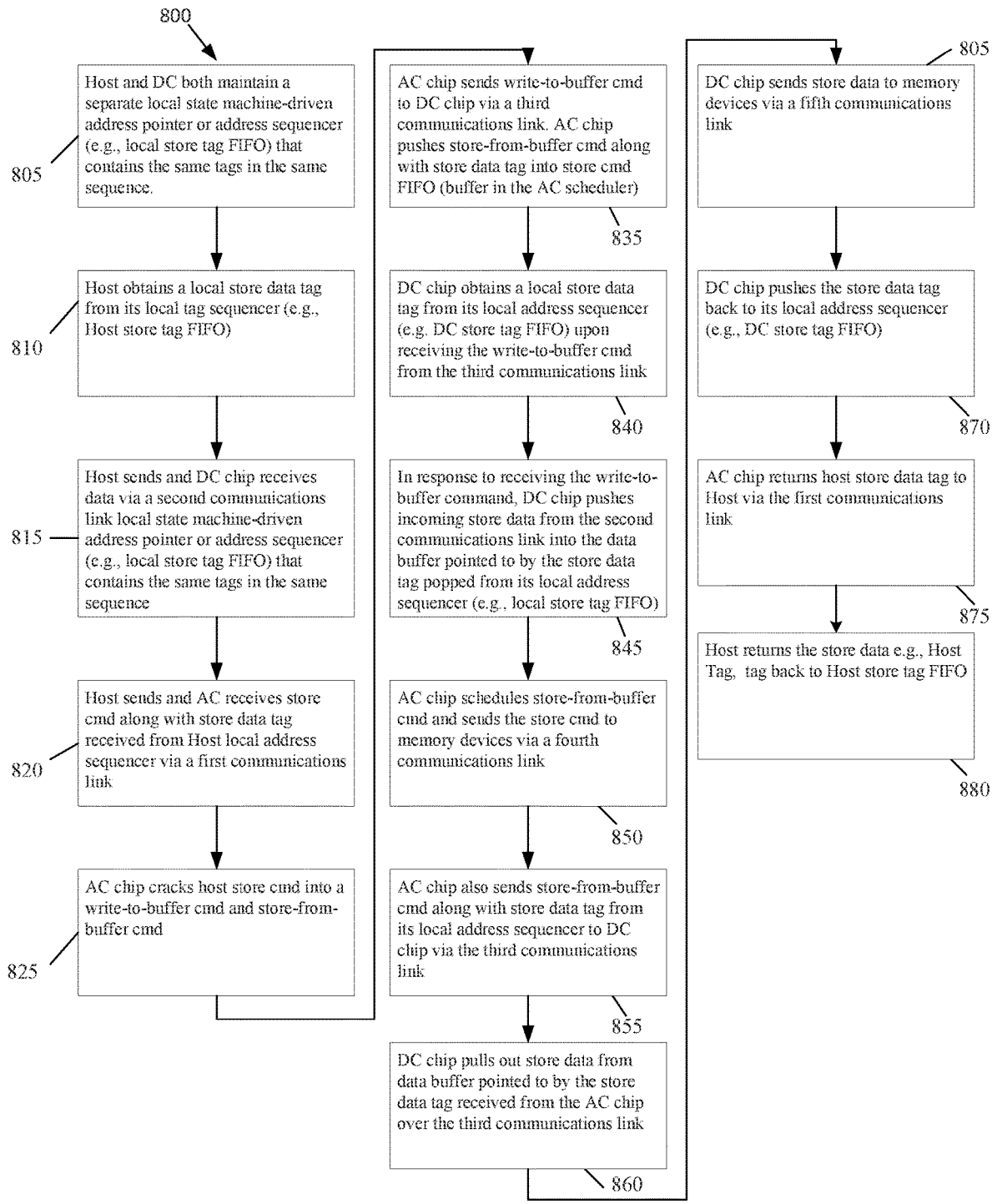
FIG. 8 depicts a flow diagram of a method of performing a store operation in accordance with one embodiment.

Further details of the operation of a memory system, including in certain embodiments distributed memory buffer systems, will be described. FIG. 8 is an exemplary flowchart in accordance with one embodiment illustrating and describing a method of storing data in a memory system, including a distributed buffer memory system, in accordance with one embodiment of the present disclosure. While the storing method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

The Host 402/410 (e.g., processor, memory controller, etc.) and the DC circuits 440 in one embodiment may maintain, as referred to at 805, separate state machine-driven address pointers or address sequencers 415, 445, e.g. local store tag FIFOs, that contain the same tags in the same sequence. As used herein, a local store data tag from the local address sequencers 415, 445 of the Host and DC circuits is a reference to a location or address in the data buffer circuits where data may be stored. A state machine-driven address pointer or address sequencer has a pool of tags that refer to or identify buffer (e.g., data buffer circuit) address locations, and the state machine-driven address pointers or address sequencers keep track of the tags and or addresses. The local address sequencers 415, 445 of the Host and DC circuits are preferably synchronized, and may be automatic and synchronized because the state machines controlling the FIFOs are synchronized. At 810, the Host 402/410 obtains a local store data tag from its local tag sequencer 415 (e.g., Host store tag FIFO). The Host, at 815, sends a store command along with a store data tag from the Host local address sequencer 415 (e.g., Host store tag FIFO) to the memory control circuit, e.g., AC chip 430, via a first communications link, e.g., link 460 in FIG. 4. For ease of reference, the memory control circuit may be referred to as an AC circuit, AC chip or AC in this discussion and in FIG. 8. The store data tag from the Host local address sequencer 415 correlates with and identifies the data buffer location in the data buffer circuits. In FIG. 5, the Address (location in DRAMS where the data is to be stored) is sent as bits A0-A38, whereas the tag that tracks the operation is Q0-Q6.

At 820, the Host sends and the data buffer circuits receive data to be stored to a data buffer circuit, e.g., DC chip, via second communications link, e.g., link 465 in FIG. 4. In one embodiment, no control signal, e.g., address tag, is sent over the communication link 465 between the Host and the data buffer circuits. Only data (and CRC) in this embodiment is sent over the communication link (e.g., link 465 in FIG. 4) between the Host and the data buffer circuits. The data to be stored in the data buffer circuits or DC circuits may be sent to the DC circuits after a configurable (or programmable) delay. By not sending an address tag over link 465, the efficiency of or ability of link 465 to transmit data may be increased. For ease of reference, the data buffer circuits may be referred to as DC circuits, DC chips, or DC in this discussion and in FIG. 8.

The AC circuit at 825, decodes, processes, and/or cracks the Host store command into a write-to-buffer ("write buffer") command and store-from-buffer ("store buffer") command. At 830, the AC circuit 430 sends and the DC circuits 440 receive the write-to-buffer command preferably via a third different communications link, e.g., link 470 in FIG. 4. In one embodiment, no control signal, e.g. local store tag, is sent to the DC circuit 440 specifying where to write the data to in the data buffer circuit 440. More specifically, the AC circuit 430 does not send a store data tag to the DC circuit 440 over the third communication link, e.g., link 470 in FIG. 4. The AC circuit may also push the store-from-buffer command along with the store data tag (buffer location where the store data is held) into store command buffer 435 in the scheduler 438. That is, the store-from-buffer command is pushed into store command buffer 435 in the AC scheduler, such that this command can be scheduled later by the scheduler 438 (See e.g., 845 in flowchart of FIG. 8).

At 835, in response to receiving the write-to-buffer command for the AC circuit 430, the DC circuits 440 obtain, generate, and/or pop a local store data tag from its local address sequencers 445, e.g., local store tag FIFO. The local address sequencers 445 of the DC circuits preferably are synchronized with the local address sequencer 415 of the Host so that the local store data tag points to the same location in the DC circuits 440. In response to receiving the write-to-buffer command, at 840, the DC circuits 440 push incoming data from the second communications link, e.g., link 465 in FIG. 4, into the data buffer pointed to by the store data tag obtained, generated, and/or popped from its local address sequencers 445, e.g., local store tag FIFOs (445 in FIG. 10). The DC circuits 440 may push the data into its buffer after a configurable (or programmable) delay.

At 845, the AC circuit 430 schedules the store-from-buffer command and sends the store command to the one or more memory devices 450 via a fourth communications link, e.g., link 480 in FIG. 4. The store command may include the store command and the address location of where in the memory devices the data is to be stored. This store command is akin to the Host Store command that was earlier decoded or cracked into separate write-to-buffer and store-from-buffer commands. In one embodiment, this may be a DDR4 store operation that includes the store command and the address tag or location where the data is to be stored in the memory devices. The AC circuit 430 at 850 sends a store-from-buffer command along with store data tag to the DC circuits 440 via the third communications link, e.g., link 470 in FIG. 4. The store data tag sent to the DC circuits is a local tag that informs the DC circuits where the data to be stored to the memory devices is located in the DC circuits. At 855, the DC circuits 440 pull out data to be stored from the data buffer pointed to by store data tag received from the AC circuit 430 via the third communication link, e.g., link 470 in FIG. 4. At 860, the DC circuits 440 send data to be stored to the memory devices 450 via a fifth communications link, e.g., link 490 in FIG. 4. From the point of view of the memory devices, the memory devices see a store operation, in one embodiment a DDR4 store operation, from the combination of the AC circuits and the DC circuits.

At 865, the DC circuit 440 pushes the store data tag back to its address sequencer 445, e.g. its local store tag FIFO. At 870, the AC circuit 430 returns the host store data tag to Host via the first communications link, e.g., link 460 in FIG. 4. Return of the HOST tag indicates that the operation or command associated with that tag is complete. And at 875, the Host returns the store data tag back to the Host local address sequencer 415. While FIG. 8 discloses and describes the method as a series of steps it will be appreciated that the order described above and in FIG. 8 may be changed.

Figure 9:
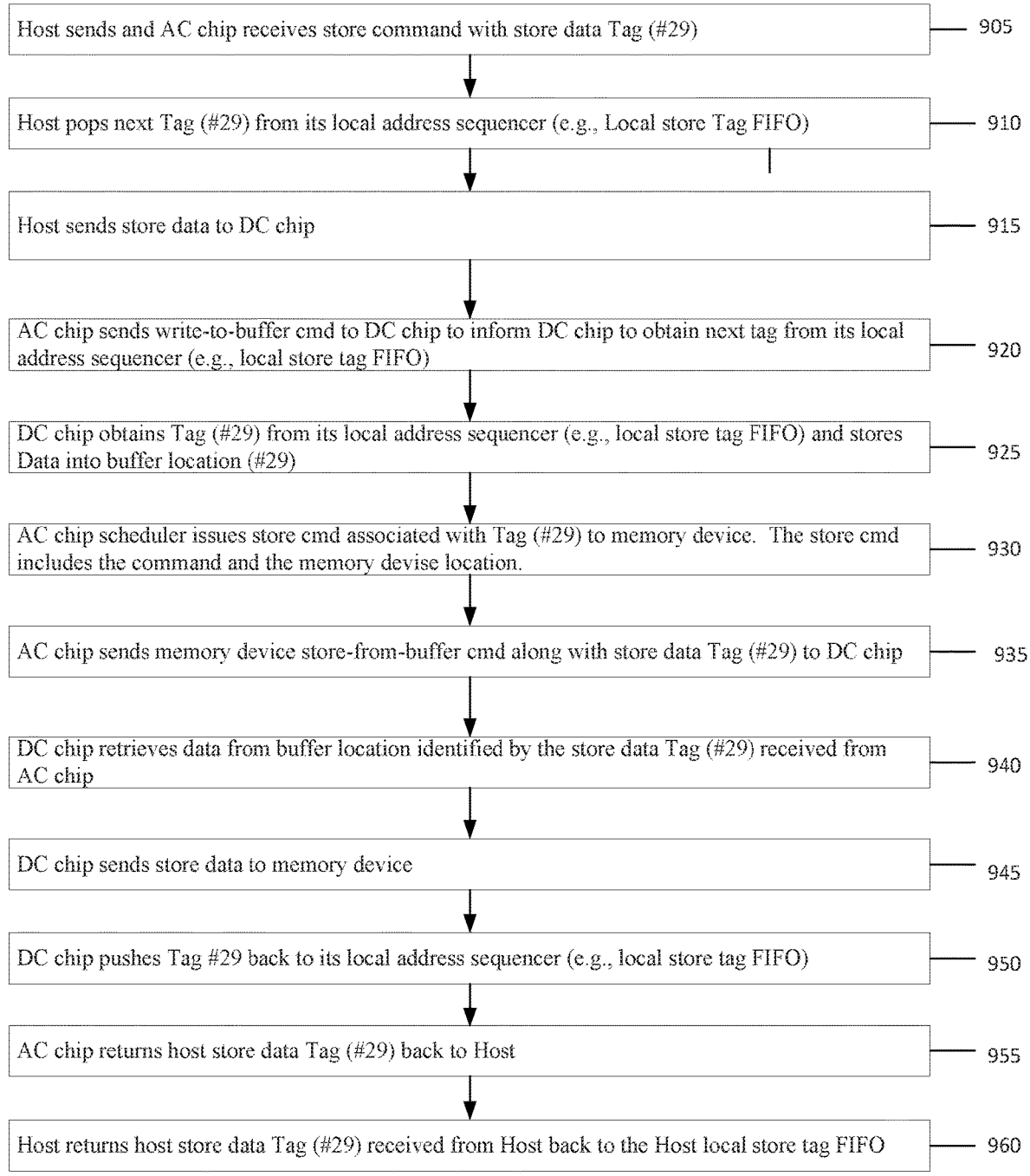
FIG. 9 depicts a flow diagram of a method performing a store operation in a memory subsystem in accordance with one embodiment.

In one aspect of the system, architecture, and method of storing data in a memory system, the Host and data buffer circuits use remote address sequencers to keep track of where in the write buffer of the data buffer circuits to write data for the next store operation. Using synchronized state machine-driven address pointers or address sequencers to track where data should be written in the data buffer circuit, e.g., the buffer address, should improve the efficiency of the data link, e.g., link 465, between the Host and DC chips, and the efficiency of the link, e.g., the BCOM link 470, between the AC chip and the DC chips. FIG. 9 shows an exemplary flow chart illustrating and describing a method of how a distributed memory buffer system can use remote sequencers to keep track of where in the write buffer of a data buffer circuit, e.g., DC chip, to write data for the next operation. The method of FIG. 9 is described in connection with FIG. 10 which illustrates the state machine-driven address pointer or address sequencer 415, 445, e.g., the local store tag FIFO, of the Host and DC chips. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

Figure 10:
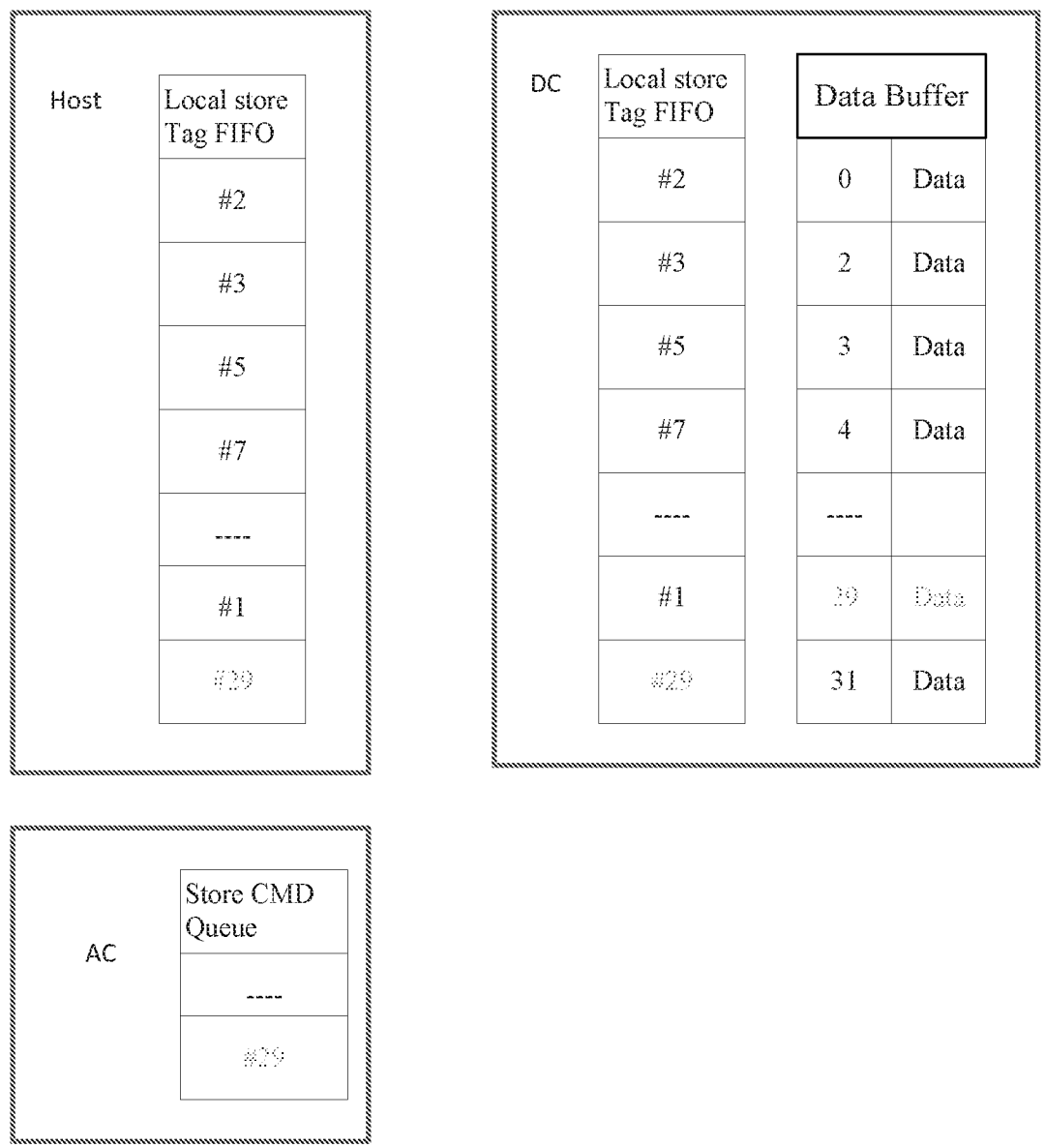
FIG. 10 depicts a diagrammatic illustration of a remote address sequencer keeping track of where in the write buffer to write the next store operation in a memory subsystem in accordance with one embodiment.

In the exemplary method of FIG. 9, at 905, the Host 402 obtains the next tag from its local address sequencer, e.g., local store tag FIFO. In the example of FIG. 10, the next tag that the Host 402 pops from its local address sequencer, e.g., Local store tag FIFO 415, is tag #29. At 910, the Host 402 sends to the memory control circuit 430 and the memory control circuit 430 receives a store command with store data tag. The store data tag may be a host store data tag that the Host obtained, generated or popped from a state machine-driven local pointer or address sequencer 415. For ease of reference, the memory control circuit in FIG. 9 and FIG. 10 alternatively may be referred to as an AC circuit, AC chip or AC. In the example of FIG. 10, the memory control circuit receives store data tag #29. The memory control circuit 430 may process, decode or crack the store command sent to it by the Host into a write-to-buffer command and a store-from-buffer command. The memory control circuit 430 may store the store-from-buffer command and its associated tag, in the store command queue or buffer 435 as shown in FIG. 10 as tag #29.

The Host 402 at 915 sends store data to the data buffer circuit 440 over link 465. Preferably, the Host sends store data to the data buffer circuit after a configurable or programmable fixed delay. The AC circuit at 920 in FIG. 9, sends the write-to-buffer command to the DC circuit 440 to inform the DC circuit 440 to obtain or pop the next tag from its local address sequencer, e.g., local store tag FIFO 445 shown in FIG. 10. The AC circuit 430 preferably sends the write-to-buffer command to the DC circuits over link 470. For ease of reference, the data buffer circuit in FIG. 9 and FIG. 10 alternatively may be referred to as a DC circuit, DC chip or DC. At 925 in FIG. 9, the DC circuits process, obtain, or pop the next tag from its local address sequencer, e.g., local store tag FIFOs 445, and stores the data from the Host into the data buffer location pointed to by the DC circuits' local address sequencers 445. In the example of FIG. 10, the DC circuits obtain tag #29 from their local address sequencers 445, e.g., its local Store Tag FIFOs, and stores the data from the Host into the data buffer location that correlates with tag #29. The local address sequencer 415 of the Host should be synchronized with local address sequencers 445 of the DC circuits 440 so that the sequencers point to the same address/location in the DC circuits, e.g., memory buffer.

The AC circuit scheduler 438 shown in FIG. 10 issues at 930 in FIG. 9 the store command to the memory devices. The store command preferably includes the command and the memory device location. The AC circuit sends to the memory devices the command (Fetch or Store) and the Memory Address (A0-A38 in FIG. 5) to the memory devices 450. In the example of FIG. 10, the memory control circuit issues store command associated with store data tag #29. The AC circuit at 935 in FIG. 9 sends a store-from-buffer command with the corresponding local store data tag to the DC circuits. In the example of FIG. 10, the AC circuit scheduler 438 issues the store-from-buffer command associated with tag #29 to the DC circuits 440. At 940 in FIG. 9, the DC circuit retrieves data from the buffer location using the local store tag received from the AC circuit. In the example of FIG. 10, the DC circuit 440 retrieves data from buffer location #29 using local tag #29 received from the AC circuit 430.

The DC circuit sends store data to the memory devices at 945 in FIG. 9. In the example of FIG. 10, the DC circuit 440 stores the data to the memory devices (e.g., memory devices 450 in FIG. 4) in the location originally identified by the host store command (the location or address identified by bits A0-A38 in FIG. 5). The DC circuits 440 at 950 in FIG. 9 push the local tag back to its address sequencers, e.g., local store tag FIFO. In the example of FIG. 10, the DC circuits 440 push back or return tag #29 to its local store tag FIFO 445. At 960 in FIG. 9, the AC circuit 430 pushes or returns the Host store data tag back to the Host. In the example of FIG. 10, the AC circuit 430 pushes or returns Host store data tag #29 back Host. The Host, at 965 in FIG. 9, returns host store data tag back to its local address sequencer 415. In the example of FIG. 10, the Host 402 returns host store data tag #29 back to the Host local address sequencer 415.

Figure 11:
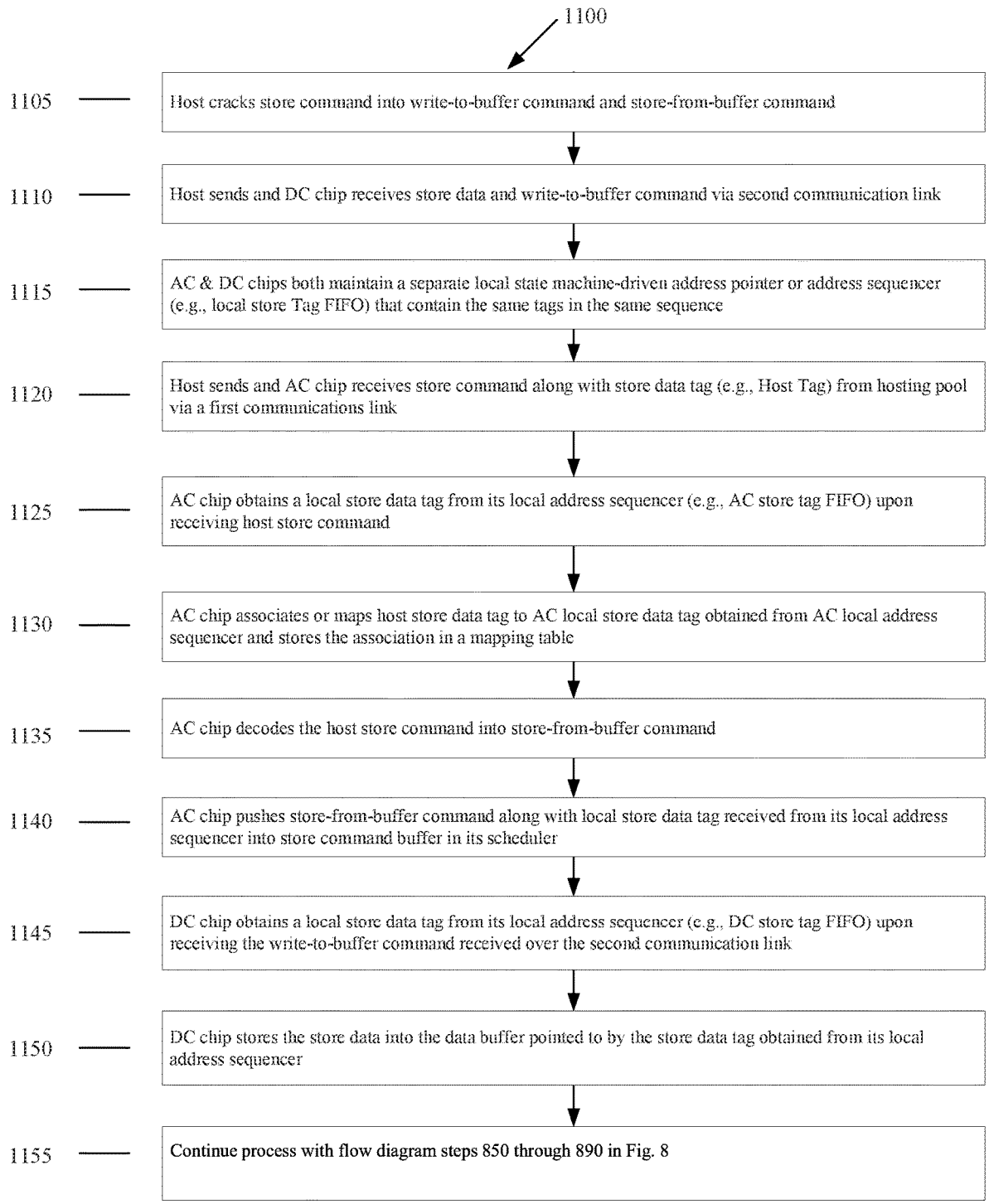
FIG. 11 depicts a flow diagram of an alternative method of performing a store operation in accordance with one embodiment.

An alternative method according to one embodiment of storing data in a memory system is shown in FIG. 11. While the method 1100 is described for the sake of convenience and not with an intent of limiting the disclosure as comprising a series and or a number of steps, it is to be understood that the process does not need to be performed as a series of steps and or the steps do not need to be performed in the order shown and described with respect to FIG. 11, but the process may be integrated and or one or more steps may be performed together, simultaneously, or the steps may be performed in the order disclosed or in an alternative order.

In the exemplary method of FIG. 11, at 1105 the Host cracks the store command into write-to-buffer command and store-from-buffer command. At 1110, the Host sends and the DC chip receives store data and the write-to-buffer command over the communications link between the Host and the DC circuit, e.g., link 465 in FIG. 4. At 1115, Host and DC chips both maintain separate local state machine-driven address pointers or local address sequencers (e.g., local store tag FIFO) that are synchronized and contain the same tags in the same order. In this embodiment, the local store tags identify a location in the memory data buffer circuit, e.g., address or location in the DC circuit. At 1120, the Host obtains a local store data tag from its local address sequencer (e.g., Host store tag FIFO). At 1125, the Host sends and the AC circuit receives store command along with store data tag (e.g., Host store data Tag) via a communications link between the Host and the AC circuit, e.g., link 460 in FIG. 4.

The AC circuit, at 1130, processes, decodes or cracks the host store command into a store-from-buffer command. The AC circuit in this embodiment does not need to send the write-to-buffer command to the DC circuit since the write-to-buffer command is sent directly from the Host to the DC circuit. At 1135, the AC circuit pushes store-from-buffer command along with local store data tag received from Host (which corresponds to and identifies address location in the buffer memory or DC circuits) into store command buffer in its scheduler. At 1140, the DC circuit 440 obtains or pops a local store data tag from its address sequencer 445, e.g., local store tag FIFO, in response to receiving the write-to-buffer command from the Host over link 465. At 1145 the data buffer circuit 440 stores the store data into the data buffer pointed to by the store data tag obtained from its local address sequencer 445.

The process of storing data in FIG. 11 continues at 1150 with the operation shown at blocks 845 through 875 in FIG. 8 and described above. In this embodiment of storing data, the AC circuit 430 decodes the host store command into store-from-buffer command. The AC circuit 430 no longer needs to send the write-to-buffer command to the DC circuits 440 since the DC circuits knows where to store the data in the DC circuits (buffer memory) as a result of the Host sending the write-to-buffer command to the data circuits over link 465. In this embodiment, the bandwidth of the BCOM link between the AC circuit 430 and the DC circuit 440 is not utilized for write-to-buffer commands. However, the bandwidth of the link between the Host and the DC circuits is not used to only transfer data. Instead of the AC circuit instructing the DC circuits to pop their local tag FIFO, as in the methods of FIGS. 8 and 9, the Host tells the DC circuits to pop their local tag FIFO. It can be appreciated that the order of processes in the method and flow diagram of FIG. 11 may be changed, for example, the data circuit can obtain its local store data tag and store the data in its buffer earlier in the process. For example, processes 1140 and 1145 may proceed before the Host sends the store command to the memory control circuits and or before processes 1115 or 1120.

Use of a synchronized state machine to track the address pointer, which stores the buffer address where data should be written, improves efficiency of the data link between the Host and the DC chips, and the AC chip and DC chips, but it may create a reliability issue. If a state machine-driven address pointer e.g., address sequencer, such as, for example, local store tag FIFO, gets out of synchronization, then the data buffer circuit will continuously write the store data to a different address than where the memory control circuit (AC chip) will tell the data to be stored in the memory devices. When this occurs there is no way to detect that one of the state machines, e.g., address sequencers, is out of synchronization and the error may go unnoticed until ECC errors (are detected) from read operations. When a read operation is performed for the address associated with faulty data, e.g., the location previously stored to with an out of sync state-machine, the ECC would be bad.

To reduce the risk of the address sequencer, e.g., the local store tag FIFO, of the memory control circuit (AC chip) and data buffer circuits (DC chips) from getting out of sync, a periodic tag or system check and resynchronization process may be implemented. The system may undergo the process of checking the synchronization of the Host local address sequencer and DC chip local address sequencers on a periodic basis, when the link to Host is idle, or according to a set frequency or time period if the check does not occur earlier. In one embodiment, the AC chip may check if BCOM link 470 is idle, and if idle, the system check may be performed. Alternatively, or in addition thereto, if the local address sequencers are not checked after a certain amount of time or number of operations, the system may nevertheless undergo a system synchronization check according to the embodiments described below. In the system where the communications link 465 is fully utilized where no idle cycle can be found for the Host 402 to send its next to be used tag after a programmable amount of time, the Host 402 signals its scheduler 418 to pause after the Host 402 sends the next to be used store data tag to all the DC chips 440 via link 465 so that the system can undergo a synchronization check. In one embodiment, the Host can send the next to be used store data tag from its local address sequencer to the data buffer circuits (DC chips) during an idle cycle of the BCOM link, and/or in an alternative embodiment, the data buffer circuit or DC chip can send the next to be used store data tag to the Host. Both processes will be described in more detail below.

Figure 12:
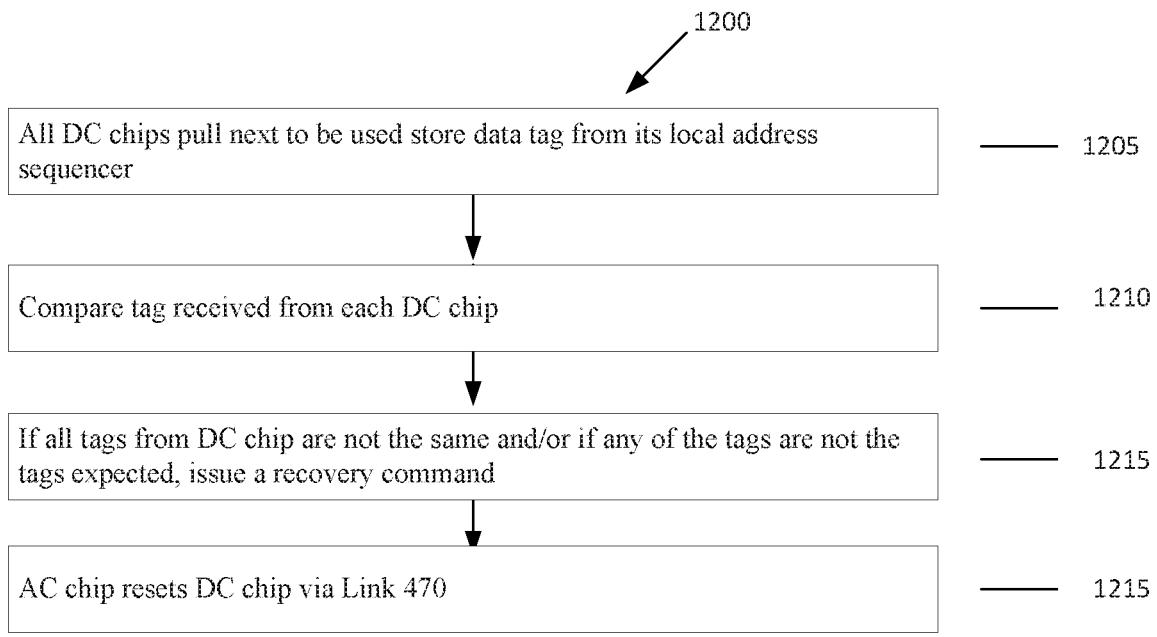
FIG. 12 depicts a flow diagram of a method of checking and/or synchronizing tags in a memory subsystem in accordance with one embodiment.

One method of checking if the state machine-driven address pointers of the memory control circuit and the data buffer circuits are out of synchronization is diagrammatically shown in the flow chart in FIG. 12. While the method 1200 in FIG. 12 is described for the sake of convenience and not with an intent of limiting the disclosure as comprising a series and or a number of steps, it is to be understood that the process does not to be need to be performed as a series of steps and or the steps do not need to be performed in the order shown and described with respect to FIG. 12, but the process may be integrated and or one or more steps may be performed together, simultaneously, or the steps may be performed in the order disclosed or in an alternative order.

At 1205 in FIG. 12, all the DC chips send their "next to be written address" from their local address sequencers to the Host. For example, the DC chips 440 in FIG. 4 may send their next to be written address, e.g., local store data tag, from its local address sequencer, e.g., local store tag FIFO 445 in FIG. 10, preferably to the Host via the second link 465. At 1210 in FIG. 12, the tags received from each DC chip 440 are compared, preferably by the Host. If any of the tags from the DC chips are different, then at 1215, a recovery command may be issued to the AC chip 430, preferably by the Host via link 460 so that the system will enter a recovery mode. As part of the recovery, at 1220 in FIG. 12, the AC chip 430 may reset the DC chip 440 via link 470. The system may undergo the process of checking the synchronization of the Host local address sequencer and DC chip local address sequencers on a periodic basis, when the link to Host is idle, or according to a set frequency or time period if the check does not occur earlier. The Host merely detects an error has occurred due to the fact that the DC chips don't all report the same next to be written address. The Host may read the status registers of the data buffer circuits (DC chips) to see where the error occurred and what the errors were. However, it is likely the Host is able to isolate which DC chip took the error without polling the status registers as it is highly unlikely that more than one DC chip will have an address sequencer (pointer) out of sync.

The recovery mode may include one or more of the following actions. The Host, e.g., processor or Host memory controller, may stop sending new operations out on the memory channel, the Host may flush all incomplete store operations, and/or the Host may wait for all fetch operations to complete. Appropriate actions may be taken, such as, for example, data queues may be drained, a lane may be spared, etc. The action may include removing or sparing out a bad DC chip if it is taking frequent errors. Some of these actions typically require entering a non-mainline mode on the memory system. The Host may also issue a state machine reset operation causing the Host and/or data buffer circuits (DC chips) all to reinitialize their state machine-driven address pointers or address sequencers. The AC chip may reset the DC chip local address sequencer by sending a command via link 470. In the preferred embodiment, such actions would be a non-mainline operation. After taking appropriate action, the system and Host may resume issuing commands on the memory channel.

Figure 13:
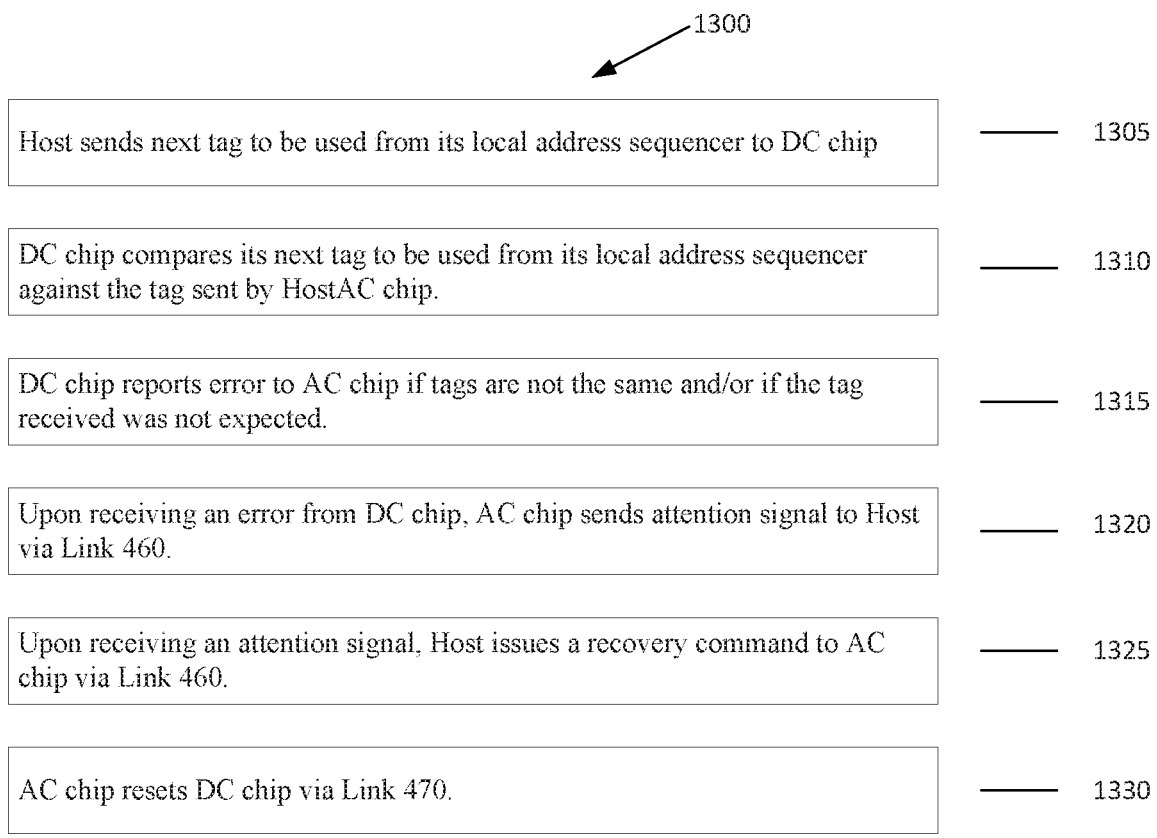
FIG. 13 depicts a flow diagram of an alternative method of checking and/or synchronizing tags in a memory subsystem in accordance with one embodiment.

An alternative method to check whether the local address sequencers of the buffer circuit (DC chip) are out of sync is shown in the flow diagram of FIG. 13. While the method 1300 in FIG. 13 is described for the sake of convenience and not with an intent of limiting the disclosure as comprising a series and or a number of steps, it is to be understood that the process does not to be need to be performed as a series of steps and or the steps do not need to be performed in the order shown and described with respect to FIG. 13, but the process may be integrated and or one or more steps may be performed together, simultaneously, or the steps may be performed in the order disclosed or in an alternative order.

The method of checking if the local address sequencers are in synchronization may also involve undergoing corrective actions. In one embodiment, corrective actions may include having the AC chip send a periodic SYNC command to the DC chips. In one embodiment, the AC chip may check if BCOM link 470 is idle, and if idle, the system check may be performed. Alternatively, or in addition thereto, if the local address sequencers are not checked after a certain amount of time or number of operations, the system may nevertheless undergo a synchronization check according to one embodiment as described below with respect to FIG. 13. In the system where the communications link 465 is fully utilized where no idle cycle can be found for the Host 402 to send its next to be used tag after a programmable amount of time, the Host 402 signals its scheduler 418 to pause after the Host 402 sends the next to be used store data tag to all the DC chips 440 via link 465 so that the system can undergo a synchronization check.

At 1305 in FIG. 13, the Host may send the next to be written to address (tag) from its local address sequencer, e.g., its local store tag FIFO, to the data buffer circuits (DC chips). In one example, the Host 402/410 may send its next to be written address tag from its local store tag FIFO 415 over the bus or link 465 to the DC chip 440. At 1310 in FIG. 13, each DC chip 440 compares its next to be written to address (tag) from its local address sequencer, e.g., its local store data tag FIFO 445, against the tag sent by the Host 402 to check that the DC chip's address pointer (address sequencer) is correct. If one of the DC chips 440 are in error or the tag received is not the expected tag, at 1315 in FIG.

13, the DC chip 440 may notify the AC chip 430 through the ATTN signal over link 475. This ATTN signal provides no information about which DC chip took the error, as this is a wired OR signal. Alternatively, the DC chip 440 sends the ATTN signal to the Host 402 over the link 465.

At 1320 in FIG. 13, the AC chip 440 then sends the error ATTN signal to the Host via link 460. The Host then may enter a recovery mode. Upon receiving an attention signal, the Host at 1325 in FIG. 13 may issue a recovery command to the AC chip 430 via link 460. The Host, however, no longer knows what is wrong and where, as it did when the DC chips simply sent the next address from the address sequencer (address pointer) to the Host. The system may enter a recovery mode whereby the Host may stop sending new operations out on the memory channel and flush all incomplete operations. Fetch and Store operations should be flushed since the Host doesn't know what is wrong or where. The system may enter a non-mainline operation. The Host may read the status registers from the DC chip registers to see where and what errors occurred. Now that the Host knows what is wrong and where, the Host may possibly take action. The action could be to spare out a bad DC chip if it is taking frequent errors. Actions may further include issuing a state-machine reset operation causing the DC chips all to reinitialize their state machine-driven address pointers, e.g., address sequencers. The AC chip at 1330 in FIG. 13 may reset the DC chip(s) 440 via link 470. After appropriate action, the system may exit non-mainline mode and resume issuing commands on the memory channel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory system for storing data in response to commands received from a Host that is remote from the memory system, the memory system comprising:

a memory control circuit formed on a single chip and configured to receive commands from the Host;

a plurality of memory devices, each of the plurality of memory devices formed on a single chip, and configured to store data and receive command signals from the memory control circuit;

a plurality of data buffer circuits, each of the plurality of data buffer circuits formed on a separate chip and associated with one of the plurality of memory devices, wherein the at least one of the plurality of data buffer circuits comprises a data buffer state machine-driven local address sequencer that has a pointer that identifies the next local store data tag identifying a location of the at least one of the plurality of data buffer circuits to write data, wherein the state machine-driven local address pointer of the at least one of the plurality of data buffer circuits is synchronized with a pointer of a state machine driven local address sequencer of the Host;

a data link for communicating data between the Host and the plurality of memory devices, wherein the data link includes a data communications link directly connecting the Host and each of the plurality of data buffer circuits for sending only data or only data and cyclic redundancy check (CRC) directly between the Host and each of the plurality of data buffer circuits, and a data transfer link directly connecting the plurality of data buffer circuits and the plurality of memory devices for sending the data directly between the plurality of memory devices and the plurality of memory devices;

a communications link directly connecting the Host and the memory control circuit for sending commands from the Host directly to the memory control circuit;

a command bus directly connecting the memory control circuit and the plurality of memory devices; and a one-way control communications link directly connecting the memory control circuit and the plurality of data buffer circuits and no link connecting the memory control circuit and the plurality of data buffer circuits for transmitting data from the memory control circuit to the plurality of data buffer circuits, wherein the one-way control communications link is for sending commands directly from the memory control circuit to the plurality of data buffer circuits and not sending the data over the one-way control communications link directly connecting the memory control circuit and the plurality of data buffer circuits, wherein the memory control circuit chip, the plurality of memory chips, the plurality of data buffer chips, the data link, the communications link, the command bus, and the one-way control communications link are configured on a single module where the plurality of memory device chips are arranged in groups, wherein the memory control circuit is configured to:
receive a store command and a local store data tag from the Host over the communications link directly connecting the Host and the memory control circuit, wherein the local store data tag specifies a location in the plurality of data buffer circuits;

in response to receiving the Host store command, decode the store command into a write-to-buffer command for writing data from the Host to the plurality of data buffer circuits and a store-from-buffer command for storing data from the plurality of data buffer circuits to the plurality of memory chips; and send the write-to-buffer command to at least one of the plurality of data buffer circuits over the one-way control communications link, but not send the local store data tag together with the write-to-buffer command over the one-way control communications link to the at least one of the plurality of data buffer circuits, and wherein the at least one of the plurality of data buffer circuits is configured to:

not receive the local store data tag specifying the location to store the data in the at least one of the plurality of data buffer circuits.

2. The system of claim 1, wherein the system is configured so that no local store data tag is sent to the plurality of data buffer circuits over the data communication link between the Host and the plurality of data buffer circuits.

3. The system of claim 2, wherein the at least one of the plurality of data buffer circuits is configured to:

receive store data from the Host over the data communications link between the Host and the at least one of the plurality of data buffer circuits;

in response to receiving the write-to-buffer command from the memory control circuit, obtain an address sequencer local store data tag from a data buffer circuit local address sequencer; and push incoming store data into the at least one of the plurality of data buffer circuits pointed to by the address sequencer local store data tag obtained from the data buffer circuit local address sequencer.

4. The system of claim 3, wherein only data is transmitted on the data communications link directly connecting the at least one of the plurality of data buffer circuits and the Host, and the memory control circuit is configured to send a memory device store command to the plurality of memory devices over the command bus, the memory device store command comprising a command and an address location to store the data in the plurality of memory devices.

5. The system of claim 4, wherein the memory control circuit is further configured to send the store-from-buffer command along with the local store data tag to the at least one of the plurality of data buffer circuits.

6. The system of claim 5, wherein the store-from-buffer command and the local store data tag are sent to the at least one of the plurality of data buffer circuits over the one-way control communications link directly connecting the memory control circuit and the at least one of the plurality of data buffer circuits, wherein the one-way control communications link is a broadcast (BCOM) link.

7. The system of claim 4, wherein the at least one of the plurality of data buffer circuits is further configured to pull store data from the data buffer location pointed to by the local store data tag received with the store-from-buffer command from the memory control circuit over the one-way control communications link and send the store data to the at least one memory device over the data transfer link.

8. The system of claim 1, wherein the data buffer circuit state machine-driven local address sequencer is configured to have the same local store data tags in the same sequence as the host state machine-driven local address sequencer.

9. The system of claim 8, further configured to check whether the data buffer circuit state machine-driven local address sequencer has the same next local store data tag as the host state machine-driven local address sequencer, and if the next local store data tag is different, then resetting at least one of a group consisting of the data buffer state machine-driven local address sequencer, the host state machine-driven local address sequencer, and combinations thereof.

10. A memory system for reading and writing data to a memory device from the Host, wherein the Host has a local address sequencer that has local store tag data tags in a sequence; the system comprising:

at least one memory control circuit configured to receive commands from a Host and to output command and control signals, at least one memory device configured to read and store data;

at least one data buffer circuit associated with the at least one memory control circuit, the data buffer circuit having a local address sequencer which has local store data tags identifying the location to store data in the at least one data buffer circuit, the at least one data buffer circuit having its local store data tags in the same sequence as the local address sequencer of the Host;

a data communications link for communicating data between the Host and the at least one data buffer circuit; and a control communications link between the at least one memory control circuit, the at least one memory device, and the at least one data buffer circuit for transmitting reading and writing operation signals of the memory system, and wherein the at least one data buffer circuit is configured to:

obtain a local store data tag from its local address sequencer in response to receiving a write-to-buffer command;

send incoming store data into a data buffer address location pointed to by the local store data tag obtained by the local address sequencer of the at least one data buffer circuit; and send store data to the at least one memory device.

11. The system of claim 10, wherein the at least one memory control circuit is configured to:

receive a store command and a local store data tag from the Host;

process a store command into a write-to-buffer command and a store-from-buffer command;

send the write-to-buffer command to the data buffer circuit;

send the store command to the at least one memory device; and send the store-from-buffer command along with the local store data tag to the at least one data buffer circuit, wherein the write-to-buffer command is sent by the memory control circuit to the at least one data buffer circuit but not with the local store data tag corresponding to that write-to-buffer command.

12. The system of claim 11, wherein no local store data tag is sent to the at least one data buffer circuit over the data communications link between the Host and the at least one data buffer circuit, and no local store data tag corresponding to the write-to-buffer command is sent to the at least one data buffer circuit.

13. The system of claim 10, configured to send the store-from-buffer command and the local store data tag corresponding to that store-from-buffer command to the data buffer circuit by the memory control circuit over the link between the memory control circuit and the at least one data buffer circuit.

14. A method for storing data in memory devices that are remote from a Host, the method comprising:

receiving a store command along with a local store data tag at a memory control circuit directly from the Host, wherein the local store data tag specifies a location in a data buffer circuit;

sending store data directly to the data buffer circuit from the Host without sending a store data tag to the data buffer circuit from the Host;

processing the store command in the memory control circuit into a write-to-buffer command and a store-from-buffer command;

sending the write-to-buffer command to the data buffer circuit;

obtaining an address sequencer local store data tag from an address sequencer in the data buffer circuit, wherein the data buffer circuit address sequencer contains address sequencer local store data tags in the same sequence as the local store data tags received at the memory control circuit directly from the Host; and pushing the store data sent to the data buffer circuit from the Host into the location in the data buffer circuit pointed to by the address sequencer local store data tag obtained from the data buffer circuit local address sequencer.

15. The method of claim 14, wherein the data buffer circuit pushes the store data into the location in the data buffer circuit after a configurable delay in response to receiving the write-to-buffer command.

16. The method of claim 14, wherein the memory control circuit in response to sending the write-to-buffer command to the data buffer circuit is configured not to send the local store data tag received from the Host to the data buffer circuit.

* * * * *